United States Patent
Lau et al.

(10) Patent No.: US 11,795,784 B1
(45) Date of Patent: Oct. 24, 2023

(54) SYSTEM AND METHOD FOR CARBON DIOXIDE SEQUESTRATION IN OFFSHORE SALINE AQUIFERS AS CARBON DIOXIDE HYDRATE

(71) Applicant: Low Carbon Energies, LLC, Bellaire, TX (US)

(72) Inventors: Hon Chung Lau, Bellaire, TX (US); Kai Zhang, Calgary (CA)

(73) Assignee: Low Carbon Energies, LLC, Bellaire, TX (US)

( * ) Notice: Subject to any disclaimer, the term of this patent is extended or adjusted under 35 U.S.C. 154(b) by 0 days.

(21) Appl. No.: 17/900,758

(22) Filed: Aug. 31, 2022

Related U.S. Application Data

(60) Provisional application No. 63/339,331, filed on May 6, 2022.

(51) Int. Cl.
*E21B 43/16* (2006.01)
*E21B 41/00* (2006.01)

(52) U.S. Cl.
CPC ........ *E21B 41/0064* (2013.01); *E21B 43/164* (2013.01)

(58) Field of Classification Search
CPC .......................... E21B 41/0064; E21B 43/164
USPC ...................................................... 166/402
See application file for complete search history.

(56) References Cited

U.S. PATENT DOCUMENTS

| | | | |
|---|---|---|---|
| 8,939,223 B2 * | 1/2015 | Kameyama | E21B 43/164 166/402 |
| 9,303,867 B2 * | 4/2016 | MacAdam | F23C 10/005 |
| 9,869,167 B2 * | 1/2018 | Randolph | F03G 4/026 |
| 10,087,720 B1 * | 10/2018 | Vance | E21B 43/164 |

* cited by examiner

*Primary Examiner* — Zakiya W Bates
*Assistant Examiner* — Ashish K Varma
(74) *Attorney, Agent, or Firm* — Phillip Black; Withers Bergman LLP

(57) ABSTRACT

A $CO_2$ sequestration system sequesters carbon dioxide as carbon dioxide hydrate in offshore saline aquifers. The system includes an offshore aquifer in a tropical region. A plurality of wellbores are positioned inside or around a perimeter of the aquifer. The $CO_2$ may be injected into the aquifer via separate injectors located in the wellbores connected to the aquifer while aquifer water or brine is produced from one or more of the other wellbores and provided to the aquifer. Injection of the $CO_2$ into and production of water from the offshore aquifer at separately timed intervals may maintain the reservoir pressure below the reservoir fracture pressure and the hydrate formation pressure so that the $CO_2$ may be stored as carbon dioxide hydrate within the aquifer. Depending on the specific output desired, the aquifer may be positioned either straddling or within a hydrate stability zone. A method for sequestering $CO_2$ uses the aforementioned system to carry out $CO_2$ sequestration.

20 Claims, 24 Drawing Sheets

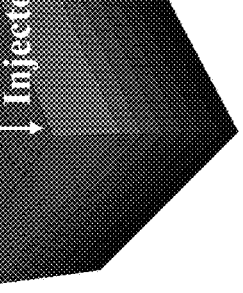
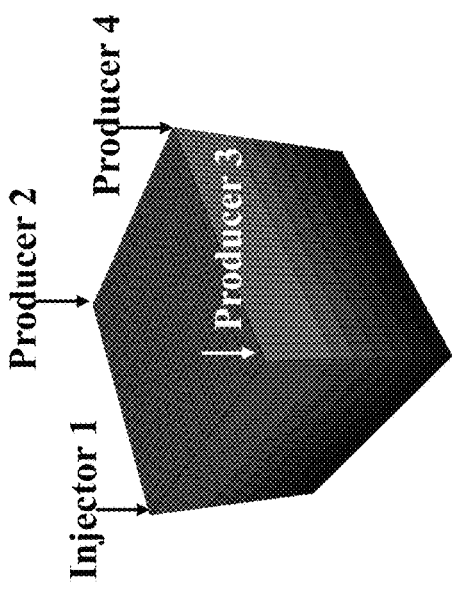
FIG. 7A
FIG. 7B
FIG. 7C
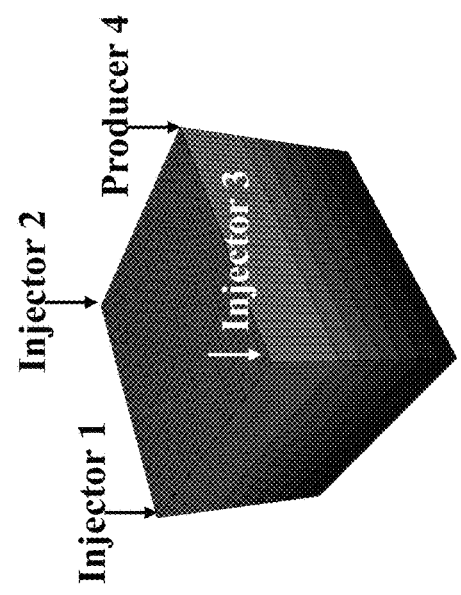
FIG. 7D $CO_2$ hydrate in fraction of pore volume Case 1: There is no $CO_2$ hydrate (white) formation at 2081. No $CO_2$ hydrate layer exists to prevent free $CO_2$ leakage.

Case 2: There is $CO_2$ hydrate (white) formation at 2221. The $CO_2$ hydrate layer can prevent the free $CO_2$ leakage even at a caprock permeability of 1000 md.

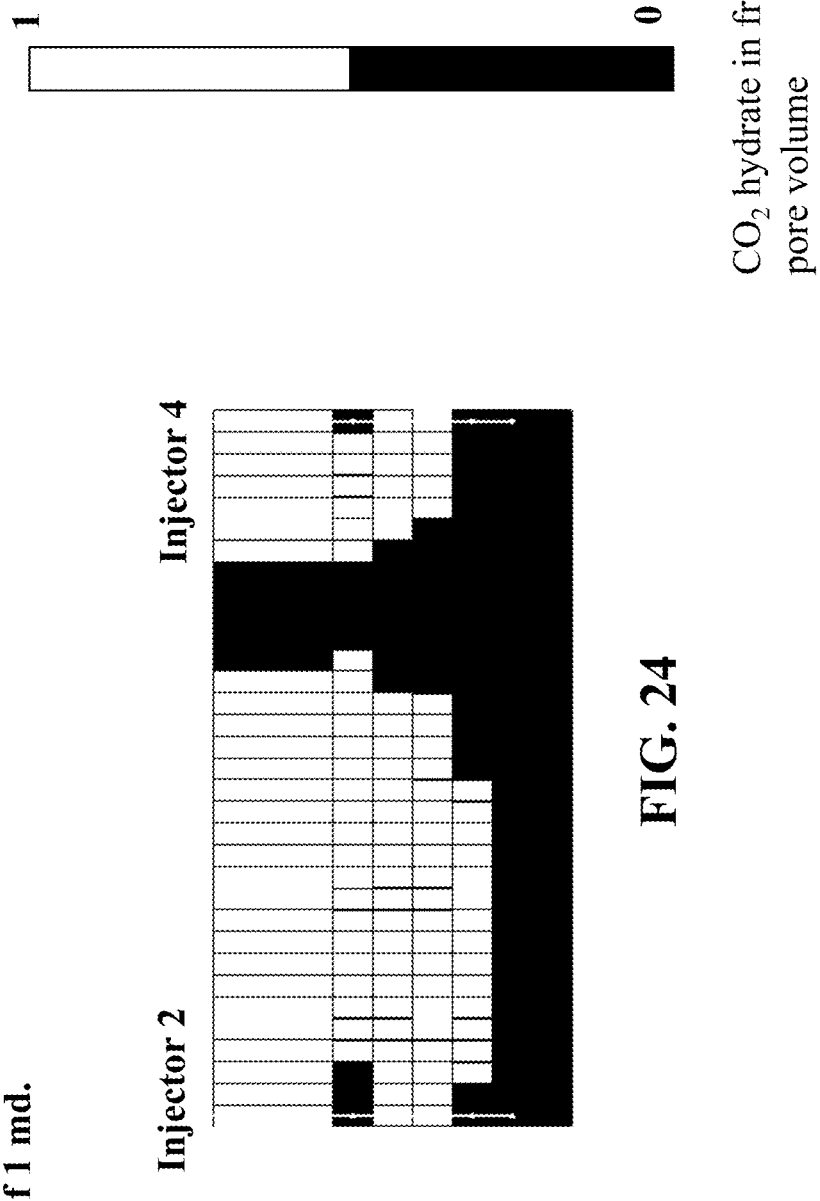

SYSTEM AND METHOD FOR CARBON DIOXIDE SEQUESTRATION IN OFFSHORE SALINE AQUIFERS AS CARBON DIOXIDE HYDRATE

FIELD OF THE INVENTION

The disclosure relates generally to carbon dioxide sequestration, and more specifically to sequestering carbon dioxide as carbon dioxide hydrate in offshore saline aquifers.

BACKGROUND OF THE INVENTION

The Paris Agreement sets the long-term goal to limit global warming to below 2° C., preferably to 1.5° C. above pre-industrial times. $CO_2$ is a greenhouse gas, which is released from the combustion of fossil fuels. Capturing the emitted $CO_2$ and storing it permanently in a subsurface reservoir, commonly known as carbon capture and storage (CCS), is an important technology for reducing anthropogenic $CO_2$ emission. In some industries, such as cement production, refineries, iron and steel, and petrochemical, it is difficult to avoid the $CO_2$ emission without CCS. The first project to inject captured $CO_2$ into an aquifer for the purpose of storage was initiated in 1996.

The mechanisms of $CO_2$ storage in an aquifer include structural trapping, capillary trapping, solubility trapping, and mineralization. When $CO_2$ is injected into a saline aquifer, $CO_2$ moves upwards because it is lighter than the formation brine, except in an aquifer at ultradeep water depths (over 3,800 meters in tropical regions) with high pressure and low temperature where $CO_2$ is denser than the formation brine. Injected $CO_2$ moves upward until it encounters an impermeable caprock. Structural trapping requires a confining caprock to avoid $CO_2$ leakage. This trapping efficiency is determined by the structure of the sedimentary basin. Capillary trapping is caused by the movement of $CO_2$ and water. When injected $CO_2$ displaces the formation water, the $CO_2$ saturation increases while water saturation decreases. As $CO_2$ migrates upward, water flows downward. The wetting phase (water) enters the pores occupied by the nonwetting $CO_2$ phase. The $CO_2$ saturation changes caused by water displacement leads to $CO_2$ being trapped in the pores. Solubility trapping is caused by the solubility of $CO_2$ into the brine. Solubility depends on the water salinity, reservoir pressure, and temperature. Although $CO_2$ dissolves quickly in water (which shares the same pore space), dissolution occurs slowly by diffusion and convection once the pore space is $CO_2$ saturated. Therefore, complete dissolution of injected $CO_2$ into the formation brine can take a long time. Mineralization is caused by chemical reactions between the dissolved $CO_2$ and the rock minerals. Dissolved $CO_2$ initiates geochemical reactions with the formation rock leading to the formation of carbonate minerals. However, such geochemical reactions take place over hundreds of years or longer.

$CO_2$ sequestration in saline aquifers has been investigated by reservoir simulations. Homogenous and field scale models have been used to investigate $CO_2$ storage capacity in saline aquifers. The feasibility of sequestering $CO_2$ as $CO_2$ hydrate in a saline aquifer has also been investigated through experiments. $CO_2$ hydrate formation can act as the extra barrier to $CO_2$ migration. Pore level visualization of $CO_2$ hydrate formation has shown that a substantial amount of $CO_2$ hydrate can form in a water-saturated porous medium at certain pressures and temperatures. Both free $CO_2$ and $CO_2$ hydrate can co-exist in some pores because of the shortage of water within those pores. Different pore geometries and impurities of $CO_2$ mixed with $CH_4$ and $N_2$ can affect the $CO_2$ hydrate formation in saline aquifers. Injecting $CO_2$ into a methane hydrate reservoir to displace the methane has been studied by a number of researchers. The process has been previously piloted in Alaska, with results revealing that the production rate is too slow for commercialization.

Storing $CO_2$ as $CO_2$ hydrate in offshore aquifers has been proposed and studied by a number of laboratory researchers. Results have shown that hydrate formation blocks the near wellbore pore space thus preventing further injection of $CO_2$. Consequently, it is generally believed that $CO_2$ cannot be injected into the hydrate stability zone (or HSZ).

BRIEF SUMMARY OF THE INVENTION

The disclosed subject matter provides a system for sequestering carbon dioxide as carbon dioxide clathrate in offshore saline aquifers. The system includes an offshore aquifer in a tropical region. A plurality of wellbores are positioned inside or around a perimeter of the aquifer. The $CO_2$ may be injected into the aquifer via separate injectors located in the wellbores connected to the aquifer while water is produced from wellbores not used for $CO_2$ injection. Injection of $CO_2$ into and production of water (also known as brine) from the offshore aquifer at separately timed intervals may maintain the reservoir pressure below the reservoir fracture pressure and the hydrate formation pressure so that the $CO_2$ may be stored as carbon dioxide hydrate within the aquifer. Depending on the specific output desired, the aquifer may be positioned either within, or straddling a hydrate stability zone. A method for sequestering $CO_2$ uses the aforementioned system to carry out $CO_2$ sequestration.

A method is further provided for sequestering carbon dioxide. The method includes identifying an offshore aquifer, typically but not exclusively in a tropical region, configured as a reservoir. Once the offshore aquifer is identified, a plurality of wellbores are positioned inside or around the perimeter of the offshore aquifer. $CO_2$ is then injected into the aquifer through one or more wellbores while water is produced from the aquifer through the other wellbores. Water production may maintain the reservoir pressure below the reservoir fracture pressure and the hydrate formation pressure. In certain embodiments, in order to get a certain amount of $CO_2$ stored, the offshore aquifer may be positioned either inside of a hydrate stability zone or straddling a hydrate stability zone.

BRIEF DESCRIPTION OF THE DRAWINGS

The disclosed subject matter, objectives, and advantages thereof, will best be understood by reference to the following detailed description of an illustrative embodiment when read in conjunction with the accompanying drawings, wherein:

FIGS. 7A-D display temperature profiles (in ° C.) of an aquifer located outside of a hydrate stability zone in accordance with embodiments. FIG. 7A displays 1 injector (Phase 1: 2021-2026). FIG. 7B displays 1 injector and 3 producers (Phase 2: 2026-2044). FIG. 7C displays 3 injectors and 1 producer (Phase 2: 2044-2066). FIG. 7D displays 4 injectors (Phase 4: 2066-2081).

FIG. 8A displays 1 injector and 3 producers (Phase 1: 2021-2105). FIG. 8B displays 3 injectors and 1 producer (Phase 2: 2105-2202). FIG. 8C displays 4 injectors (Phase 3: 2202-2221).

FIG. 9A displays 4 water producers (Phase 1: 2021-2022). FIG. 9B displays 1 injector and 3 producers (Phase 2: 2022-2027). FIG. 9C displays 3 injectors and 1 producer (Phase 3:2027-2166). FIG. 9D displays 4 injectors (Phase 4: 2166-2185).

FIG. 24 displays a cross-section views of an aquifer model inside the hydrate stability zone (Case 3) at 2185 showing the $CO_2$ leakage through a caprock in the aquifer with a permeability of 1 md in accordance with embodiments. (Unit: fraction).

DETAILED DESCRIPTION

Reference now should be made to the drawings, in which the same reference numbers are used throughout the different figures to designate the same components.

It will be understood that, although the terms first, second, third, etc. may be used herein to describe various elements, these elements should not be limited by these terms. These terms are only used to distinguish one element from another element. Thus, a first element discussed below could be termed a second element without departing from the teachings of the present disclosure.

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprises" and/or "comprising" or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

$CO_2$ Hydrate Stability Zone (HSZ)

Figure 1:
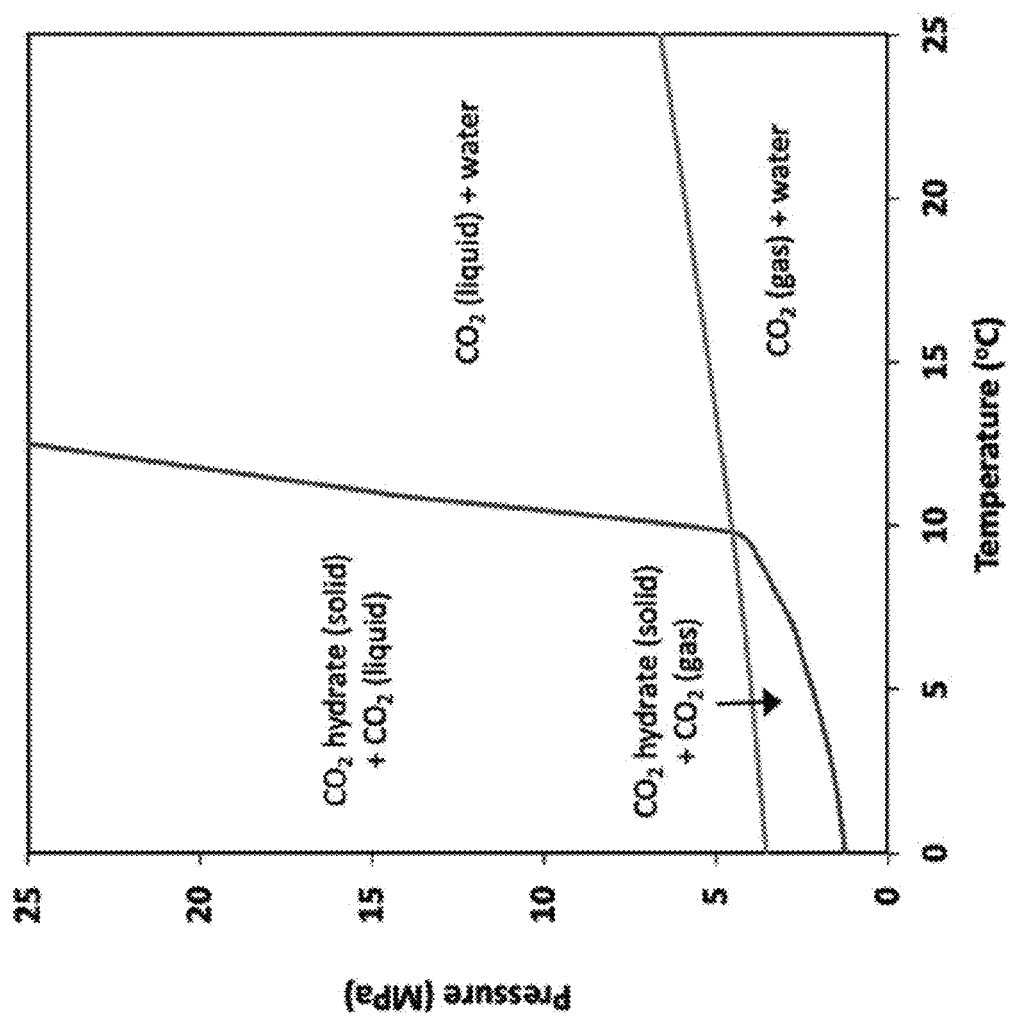
FIG. 1 displays a graphical presentation of a phase diagram of $CO_2$ hydrate in accordance with embodiments.

At low temperatures and high pressures, $CO_2$ interacts with water to form solid $CO_2$ hydrate, which is a crystal made up of water and $CO_2$ molecules with a formula of $CO_2 \cdot nH2O$ (n≥5.75). FIG. 1 shows the phase diagram of $CO_2$ hydrate. The hydrate exists below 15° C. over a range of pressures. Below 10° C., the equilibrium pressure of hydrate increases gradually with temperature. However, above 10° C., it increases very rapidly with temperature. Within the $CO_2$ hydrate phase boundary, solid $CO_2$ hydrate can coexist with liquid water and either gaseous $CO_2$ or liquid $CO_2$ depending on the temperature and pressure.

Figure 2:
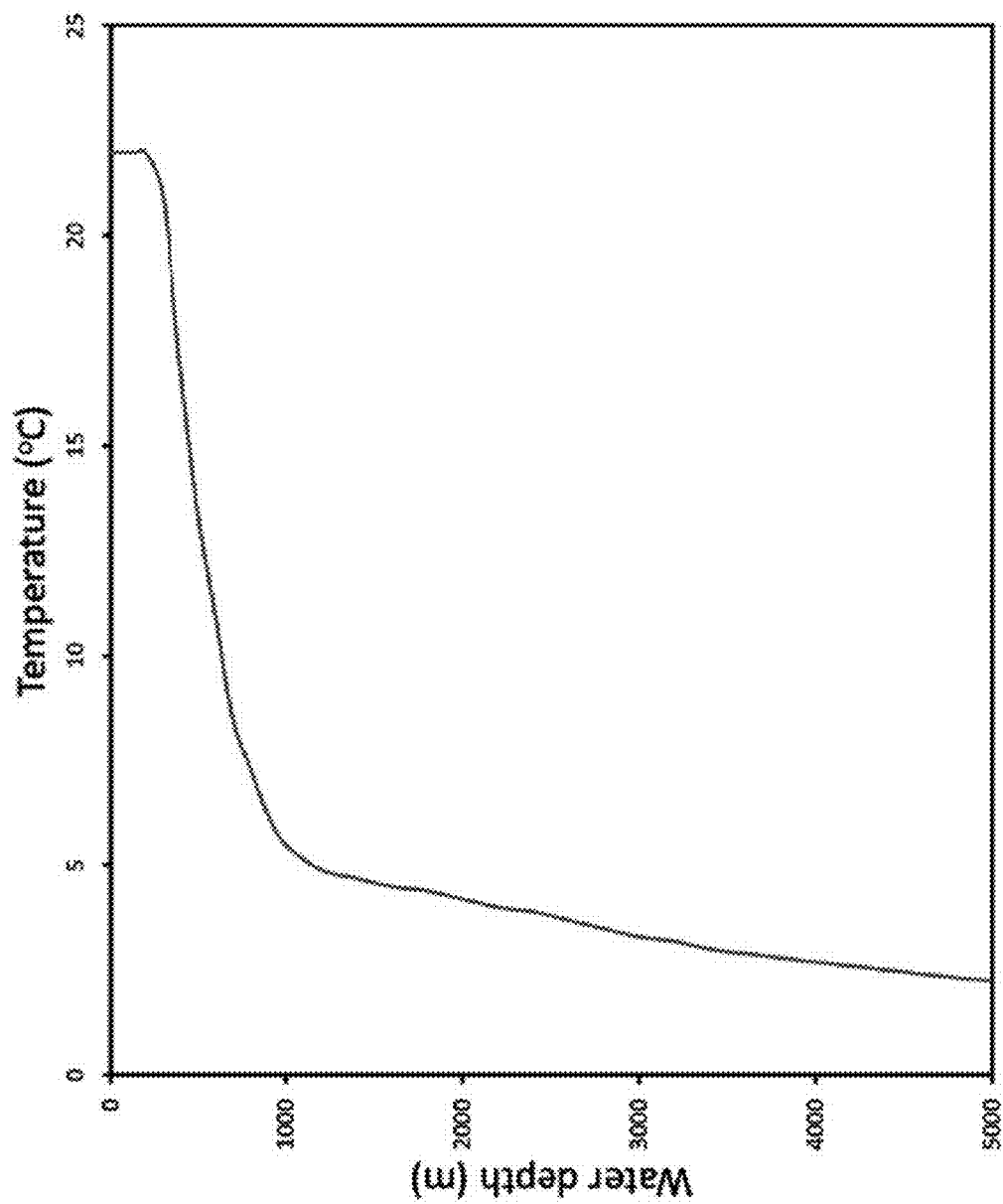
FIG. 2 displays a graphical presentation of sea water temperature in tropical regions in relation to water depth in accordance with embodiments.

In the disclosed embodiments, environmental parameters considered include tropical regions having an ocean surface temperature between 20° C. and 25° C.; a temperature profile is shown in FIG. 2. The sea water temperature drops rapidly in the thermocline region to around 5° C. at a 1,000 meter water depth. The temperature then slowly decreases with water depth to several degrees Centigrade.

Figure 3:
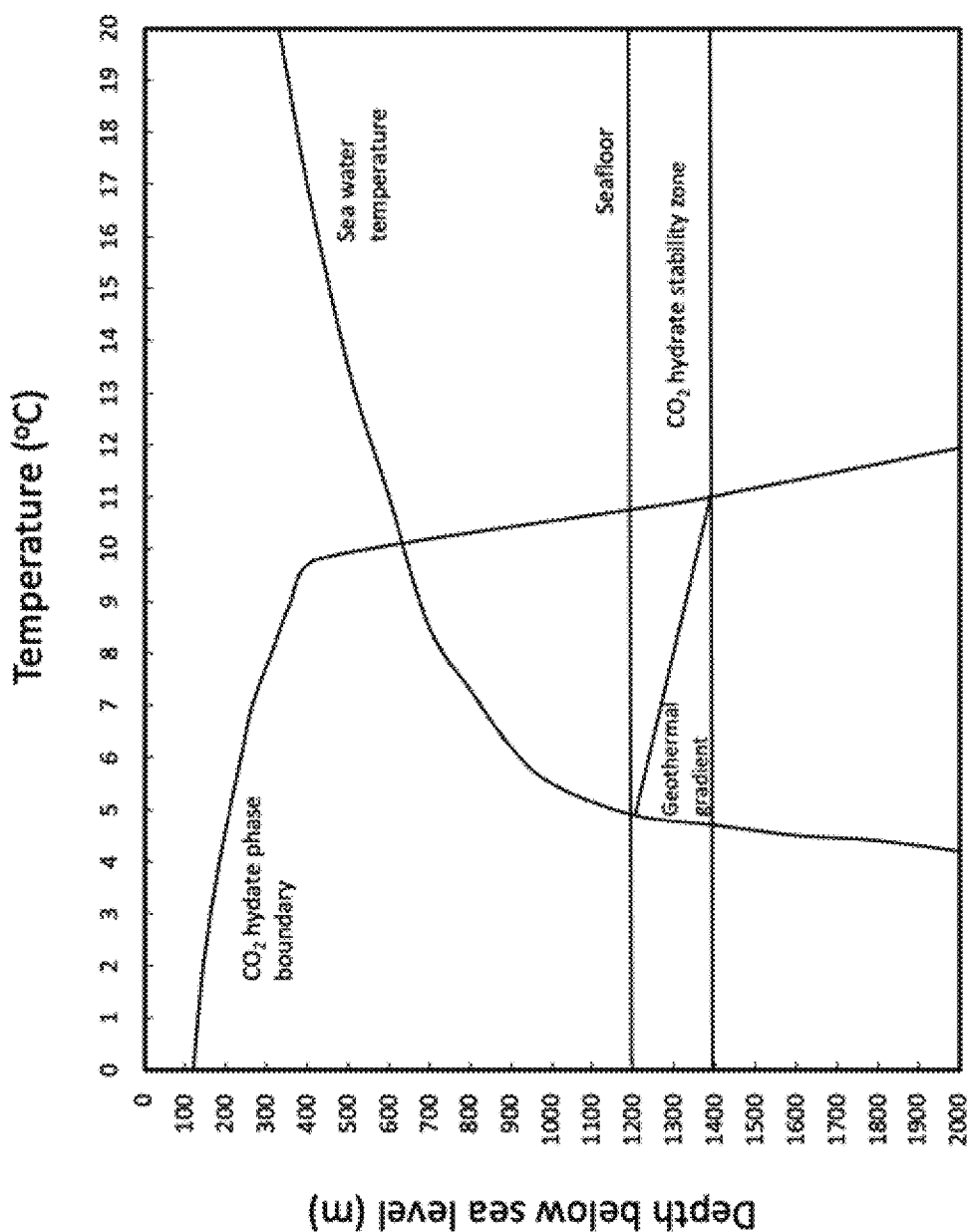
FIG. 3 displays a graphical presentation of a $CO_2$ hydrate stability zone in an offshore sediment in accordance with embodiments.

According to FIG. 1, when the water depth exceeds a critical value, the temperature and pressure in the sediment below the seafloor fall within the $CO_2$ hydrate phase diagram and a HSZ exists. The thickness of the HSZ is shown graphically in FIG. 3. In order to calculate the thickness, the pressure versus temperature phase boundary curve of the $CO_2$ hydrate (FIG. 1) is converted to a depth versus temperature curve using the seawater hydrostatic gradient. The seawater temperature profile (FIG. 2) is then plotted along with the boundary curve. From a seafloor line, a line is drawn representing the geothermal gradient. The thickness of the hydrate stability zone may be identified as the distance between the seafloor and the intersection of the geothermal gradient with the $CO_2$ phase boundary, as shown in FIG. 3. It is noted that a geothermal gradient of 30° C./km and a seawater gradient of 10.52 kPa/m (0.465 psi/ft) are utilized, which are common parameters associated with the Gulf of Mexico.

Figure 4:
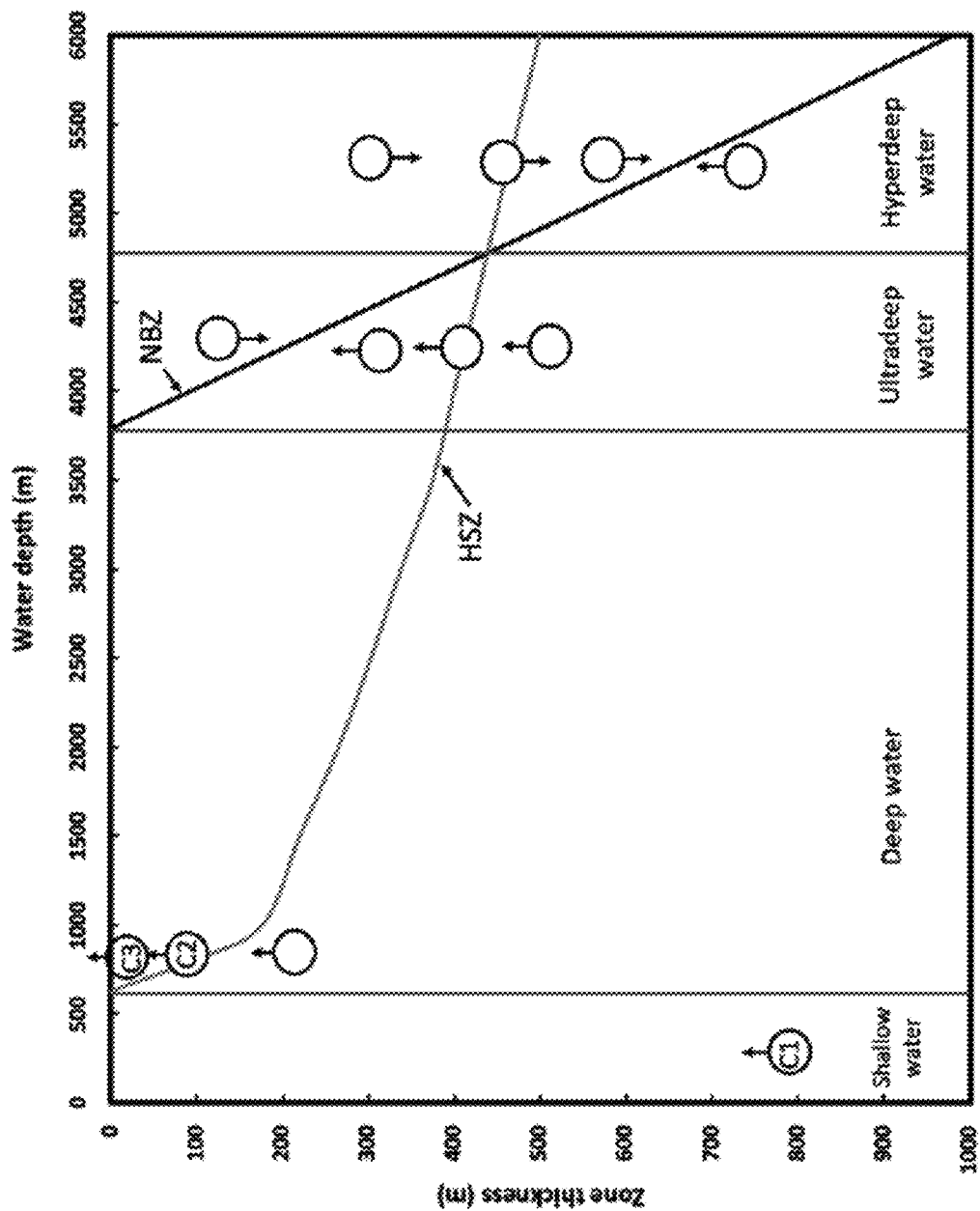
FIG. 4 displays a graphical presentation of a hydrate stability zone thickness in relation to water depth in a tropical region in accordance with embodiments.

FIG. 4 displays the HSZ at various water depths for a tropical region. It is shown that a HSZ starts to form at a water depth of 630 meters and its thickness increases to about 450 meters at a water depth of 5,000 meters. The existence of a HSZ is a first of two conditions that need to be met for the existence of $CO_2$ hydrate. The other condition is the existence of a water-bearing porous sediment (or aquifer), which provides the water and the pore space for storage of $CO_2$ hydrate. If $CO_2$ is injected into an aquifer within the HSZ, it eventually comes to equilibrium with the aquifer temperature and pressure and forms solid $CO_2$-hydrate which ends up blocking the near wellbore region, thus reducing the $CO_2$ injectivity. Consequently, it is generally believed that injection of $CO_2$ into the HSZ is not possible.

In a tropical region, at a water depth of 3,800 meters and deeper, liquid $CO_2$ is denser than formation brine. Above this water depth, a negative buoyancy zone (NBZ) exists, as shown in FIG. 4. If $CO_2$ is injected into an aquifer at a depth shallower than the NBZ, it will sink until it reaches the bottom of the NBZ where it will be neutrally buoyant. If $CO_2$ is injected deeper than the NBZ, it will rise until it reaches the bottom of the NBZ. Therefore, the existence of a NBZ guarantees that injected $CO_2$ will not rise to the seafloor; it acts as a barrier to post-injection $CO_2$ migration. As shown, the thickness of the NBZ increases with water depth. At a water depth of 4,700 m, the NBZ and the HSZ have the same thickness. At water depth deeper than this, the NBZ is thicker than the HSZ. However, injection of $CO_2$ into an aquifer at such a water depth may be considered impractical due to the high cost of ultradeep water wells. Therefore, water depths where a NBZ does not exist are analyzed.

Barriers to Post Injection Upward $CO_2$ Migration

For subsurface storage of $CO_2$, it is important to determine the number of barriers to upward $CO_2$ migration subsequent to injection to ensure that the injected $CO_2$ does not leak to shallower zones and eventually to the seafloor. Depending on water depth and buried depth, there can be up to three independent barriers to upward $CO_2$ migration. The first and primary barrier to upward $CO_2$ migration is the confining overburden of an aquifer (usually formed of mudstone, siltstone, or shale) having very low porosity and permeability. This barrier exists for confined aquifers at all water depths. The second barrier to upward $CO_2$ migration is the HSZ for aquifers having a water depth of 630 meters or deeper. If $CO_2$ breaches the aquifer overburden and migrates to the HSZ, the formation of solid $CO_2$ hydrate will prevent further upward migration. For aquifers with a water depth exceeding 3,800 meters, the NBZ forms a third barrier to upward $CO_2$ migration. The existence of the HSZ (at water depths larger than 630 meters) and NBZ (at water depths larger than 3,800 meters) creates additional barriers (besides the aquifer) to upward $CO_2$ migration, which is beneficial for permanent $CO_2$ storage.

Hitherto, storage of $CO_2$ in offshore saline aquifers is mostly limited to shallow water aquifers with a water depth below around 600 meters. In tropical regions, aquifers with such a water depth do not have a HSZ, as depicted in FIG. 4. In these areas, $CO_2$ migration may be monitored by acoustic tomography, 4D seismic, or other techniques in order to detect $CO_2$ leakage.

Figure 5:
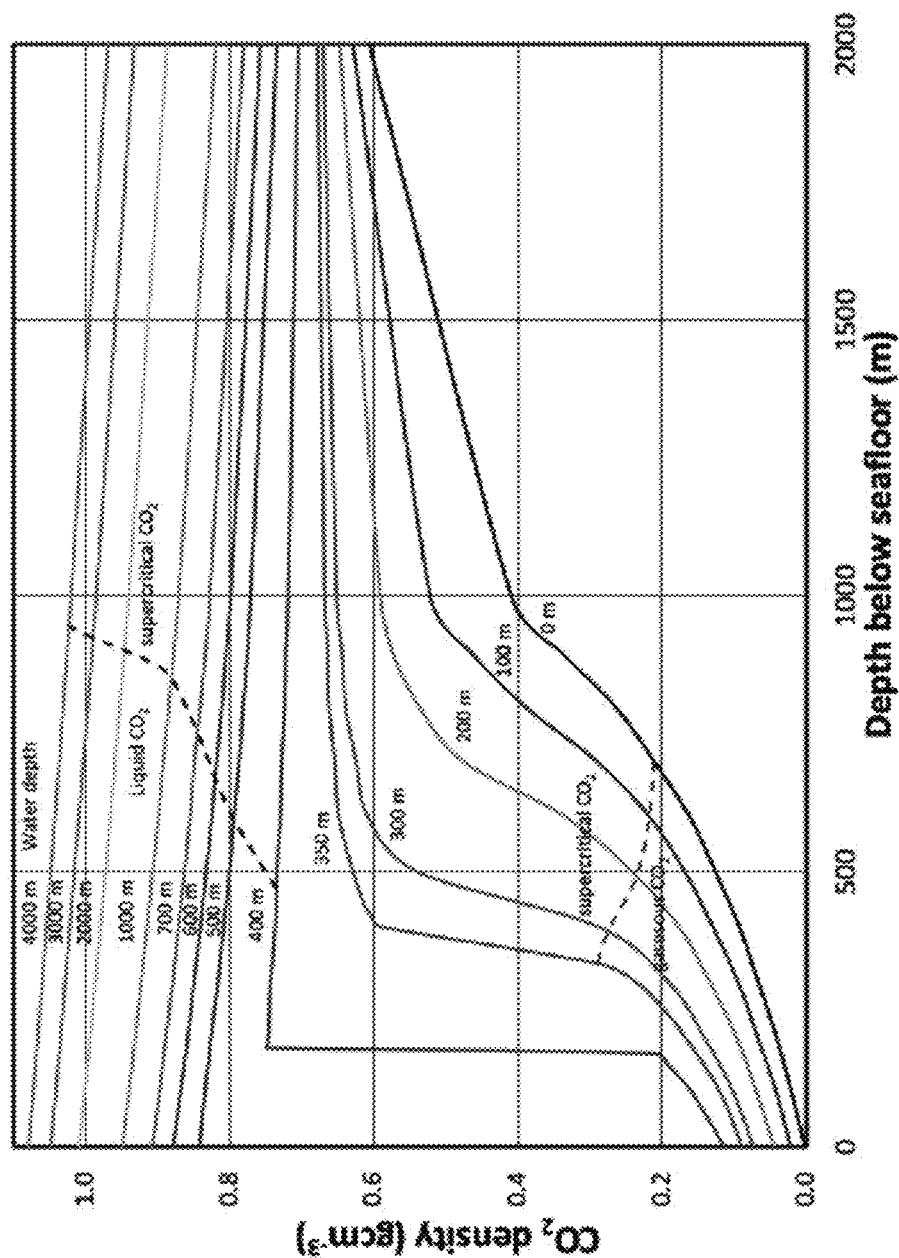
FIG. 5 displays a graphical presentation of the density of $CO_2$ in relation to depth in an offshore sediment in a tropical region in accordance with embodiments.

The disclosure presents the feasibility of storing $CO_2$ in a tropical region as $CO_2$ hydrate within the HSZ in an offshore aquifer. Two major advantages are associated with this scenario. First, if $CO_2$ can be stored as solid $CO_2$ hydrate, it becomes immobilized and the risk of leakage may be substantially reduced. In fact, immobilizing $CO_2$ as $CO_2$ hydrate serves as an additional barrier to post-injection $CO_2$ migration. Second, aquifers at deeper water depths and shallow buried depths may be able to store more $CO_2$ than aquifers at shallow water depths and deeper buried depths due to a higher $CO_2$ density. FIG. 5 gives the density of $CO_2$ at various water depths and buried depths in a tropical region assuming a seawater temperature given by FIG. 2, a seawater hydrostatic gradient of 10.52 kPa/m, and a geothermal gradient of 30° C./km. It can be seen that at a water depth of 500 meters and higher and shallow buried depth of less than 500 mbsf (meters below seafloor), $CO_2$ exists in liquid form with a density of 800 kg/m3 or higher. On the other hand, at a water depth below 300 meters and a buried depth of 800 mbsf and deeper, although $CO_2$ exists in supercritical form, its density is less than 600 kg/m3. Due to the higher density of $CO_2$ within the HSZ than outside, more $CO_2$ may be stored within the HSZ than outside of the HSZ.

Reservoir Simulation

Three aquifer models (Cases 1 to 3) have been built to study offshore $CO_2$ storage in a tropical region using the CMG-STARS simulator (of the Computer Modelling Group Ltd.). The simulator calculates the mass, momentum, and energy balances for the water, $CO_2$, $CO_2$ hydrate, and rock phases. When water and $CO_2$ combine to form $CO_2$ hydrate, $CO_2$ is in the solid phase. In the model, phase saturation may refer to $CO_2$ in the non-solid phase. The volume of $CO_2$ hydrate is given by the percent of original pore volume occupied. In FIG. 4, the three cases are shown as C1, C2, and C3. Case 1 is a shallow water (water depth of 300 m, caprock at 800 mbsf) aquifer without a HSZ. It is used as a reference case for comparison. Case 2 is a deepwater aquifer (water depth of 800 m, caprock at 40 mbsf) straddling the HSZ (60% within HSZ, 40% below). Case 3 is a deepwater aquifer (water depth of 800 m, caprock at seafloor) within the HSZ.

Reservoir parameters are given in Table 1 below. The aquifer includes seven layers including a 30 meter thick, low permeability caprock as the top layer. Below the caprock is a 50 meter thick reservoir consisting of the second to sixth layers. Below the reservoir is a 10 meter thick underburden consisting of the seventh layer. For the aquifer that straddles the HSZ, the first to fourth layers are positioned inside the HSZ. The fifth to seventh layers are positioned outside the HSZ. For the aquifer within the HSZ, all seven layers are positioned inside the HSZ. The aquifer comprises an area of 23,240 acres (9.7 km×9.7 km), a permeability of 3,000 md, and a porosity of 30%. The caprock and underburden comprise a permeability of 1×10⁻⁵ md and a porosity of 1%. In some embodiments and/or in some instances, the caprock and underburden might not be considered as targets for the $CO_2$ storage. However, potential $CO_2$ leakage through the caprock and underburden is analyzed. The ratio of horizontal to vertical permeability is assumed to be 1. The reservoir temperature and/or pressure are controlled by the geothermal and hydrostatic gradient, respectively. Initially, the reservoir is fully water saturated.

$CO_2$ hydrate properties are given in Table 3.

TABLE 3

| $CO_2$ hydrate properties | |
|---|---|
| $CO_2$ hydrate properties | Value |
| Hydration number | 6 |
| Enthalpy for formation and dissociation (kJ/mole) | 60 |
| Mass density (kg/m³) | 1,100 |
| Structure I $CO_2$ hydrate molar density (mole/m³) | 7,458 |

TABLE 1

Reservoir properties in various simulation cases

| | Case 1 | Case 2 | Case 3 |
|---|---|---|---|
| | Reservoir properties | | |
| | Aquifer outside HSZ | Aquifer straddling HSZ 60% within HSZ, 40% below | Aquifer inside HSZ |
| Reservoir dimension (km²) | 9.7 × 9.7 | 9.7 × 9.7 | 9.7 × 9.7 |
| Water depth (m) | 300 | 800 | 800 |
| Top of the caprock (mbsf) | 800 | 40 | 0 |
| Caprock thickness (m) | 30 | 30 | 30 |
| Aquifer thickness (m) | 50 | 50 | 50 |
| Base thickness (m) | 10 | 10 | 10 |
| Cap and base permeability (md) | 1 × 10⁻⁵ | 1 × 10⁻⁵ | 1 × 10⁻⁵ |
| Aquifer permeability (md) | 3,000 | 3,000 | 3,000 |
| Cap and base porosity (%) | 1 | 1 | 1 |
| Aquifer porosity (%) | 30 | 30 | 30 |
| Initial reservoir pressure (MPa) | 11.6 | 8.8 | 8.4 |
| Initial reservoir temperature (° C.) | 45.9 | 9.4 | 8.2 |
| Reservoir heat capacity (J/m³ · ° C.) | 2.6 × 10⁶ | 2.6 × 10⁶ | 2.6 × 10⁶ |
| $CO_2$ hydrate heat capacity (J/g mol · ° C.) | 203.7 | 203.7 | 203.7 |
| Rock thermal conductivity (J/m · d · ° C.) | 2.47 × 10⁵ | 2.47 × 10⁵ | 2.47 × 10⁵ |
| $CO_2$ hydrate thermal conductivity (J/m · d · ° C.) | 3.4 × 10⁴ | 3.4 × 10⁴ | 3.4 × 10⁴ |
| Water thermal conductivity (J/m · d · ° C.) | 5.53 × 10⁴ | 5.53 × 10⁴ | 5.53 × 10⁴ |
| $CO_2$ thermal conductivity (J/m · d · ° C.) | 2.93 × 10³ | 2.93 × 10³ | 2.93 × 10³ |

Figure 6:
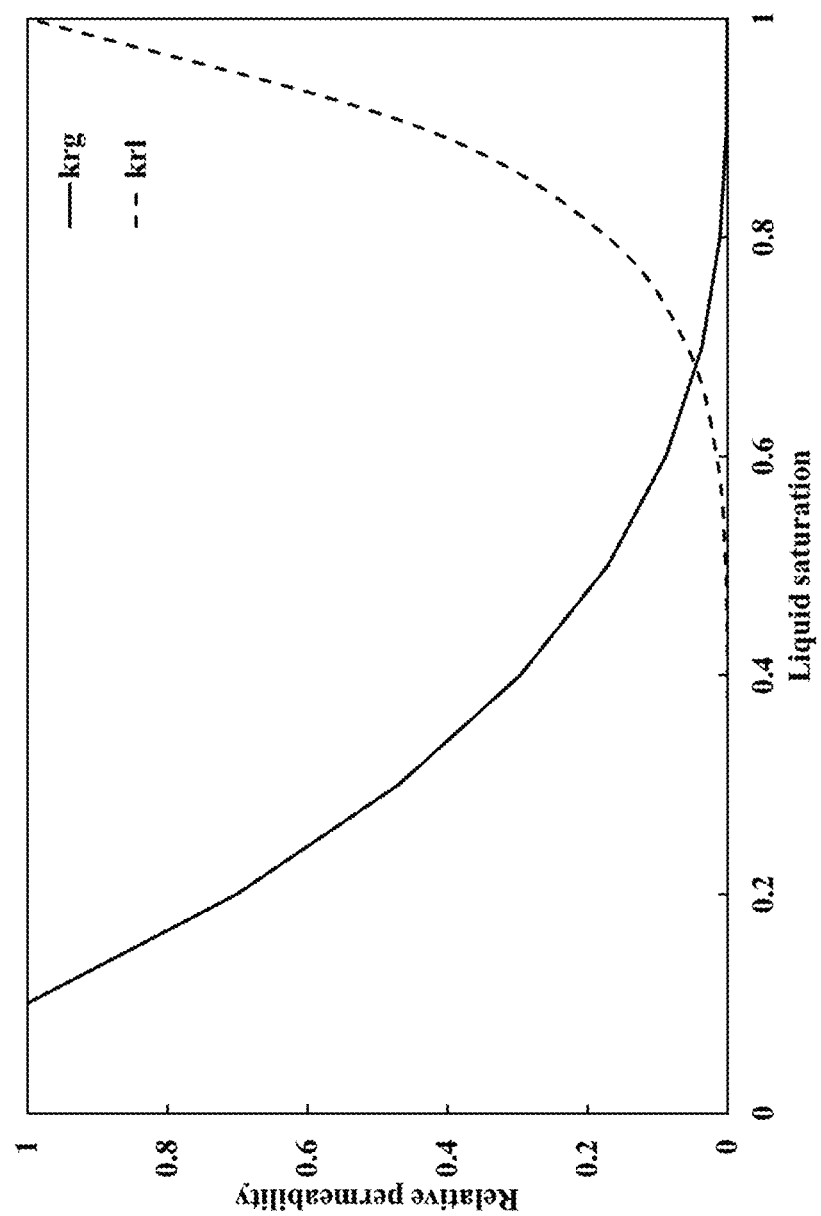
FIG. 6 displays a graphical presentation of a relative permeability model in accordance with embodiments.

The water and gas relative permeabilities, shown in FIG. 6, are characterized by the generalized Corey correlations. The parameters used in the reservoir simulation are given in Table 2.

TABLE 2

Parameters in the generalized Corey correlations in relative permeability
Generalized Corey Correlation

| | |
|---|---|
| $S_{gc}$ | 0 |
| $S_{iw}$ | 0.1 |
| $n_g$ | 3 |
| $n_w$ | 7 |
| $k_{rgcw}$ | 1 |
| $k_{rwgc}$ | 1 |

For the aquifer straddling or inside the HSZ, $CO_2$ hydrate formation is governed by the following reactions:

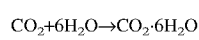

$$CO_2 + 6H_2O \rightarrow CO_2 \cdot 6H_2O$$

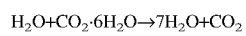

$$H_2O + CO_2 \cdot 6H_2O \rightarrow 7H_2O + CO_2$$

For aquifers without or straddling the HSZ, it is important for the reservoir pressure to be kept below the fracture pressure of the reservoir in order to avoid $CO_2$ leakage. The simulation may stop when the fracture pressure is reached. The fracture pressure may be calculated by the Eaton's method equations:

$$\sigma_{fp} = \frac{v}{1-v}(\sigma_{ob} - \sigma_P) + \sigma_P$$

$$\sigma_{ob} = \sigma_w h_w + \sigma_b h_b$$

$$\sigma_P = \sigma_w(h_w + h_b)$$

where $\sigma_{fp}$ is the fracture pressure gradient in kPa/m. v is the Poisson's ratio which is assumed to be 0.25 for sandstone, 0.4 for shale in the caprock and underburden. $\sigma_{ob}$ is the overburden pressure gradient in kPa/m. $\sigma_p$ is the pore pressure gradient in kPa/m. $\sigma_w$ is the seawater pressure gradient and is assumed to be 10.52 kPa/m for seawater. $h_w$ is the water depth in m. $\sigma_b$ is the rock pressure gradient which is assumed to be 24.88 kPa/m for sandstone. $h_b$ is the buried depth below the seabed for the sandstone reservoirs in meters.

The $CO_2$ flow rate and water availability are important parameters for $CO_2$ hydrate formation. As disclosed, the formation of $CO_2$ hydrate may be controlled via reservoir pressure management by deliberate water production and $CO_2$ injection through wellbores. As shown in FIGS. 7-9, each aquifer model is bound by four injectors each located in wellbores positioned at the corners of each aquifer model.

The initial temperature of the aquifer models is given in FIGS. 7-9. Lower temperatures may exist at the lower ends of each aquifer model while higher temperature may exist at the upper ends of each aquifer model. Each aquifer model comprises 7,623 grids covering the area of 23,240 acres. Each grid block includes a dimension of 294 meters in the x-direction and 294 meters in the y-direction. Each aquifer contains four corner wells. In the z-direction, seven layers are presented. The first layer comprises a 30 meter thick caprock. The second to sixth layers, each 10 meters thick, comprise the reservoir. The seventh layer, a 10 meter thick layer, comprises the baserock. Simulations start at Jan. 1, 2021 (2021-01-01) for all three models.

Case 1—Aquifer without a HSZ (FIGS. 7A-7D)

In Phase 1 covering five years from 2021 to 2026, a single $CO_2$ injector exists in one corner of the aquifer model (Injector 1) injecting at 2000 t/d or 0.73 Mtpa (FIG. 7A). Phase 1 may end when the reservoir pressure at the top layer in the aquifer reaches the fracture pressure (15.9 MPa) in 2026. In Phase 2, covering 18 years from 2026 to 2044, three water producers (Injectors 2-4) are added to three additional corners of the aquifer model, thus giving one $CO_2$ injector and three water producers producing at 6,000 t/d in order to reduce the reservoir pressure (FIG. 7B). Phase 2 may end when $CO_2$ breaks through in water producer-2 and water producer-3 in 2044. In Phase 3, covering 22 years from 2044 to 2066, water producer-2 and water producer-3 are converted into $CO_2$ injector-2 and $CO_2$ injector-3 thus giving three $CO_2$ injectors injecting at 3,000 t/d (1.1 Mtpa) and one water producer producing at 5,000 t/d (FIG. 7C). Phase 3 ends when $CO_2$ breaks through in water producer-4 in 2006. In Phase 4, covering 15 years from 2066 to 2081, water producer-4 is converted into $CO_2$ injector-4 thus giving four $CO_2$ injectors injecting at 4,000 t/d or 1.5 Mtpa (FIG. 7D). The simulation stops when the reservoir pressure in the top reservoir layer reaches the fracture pressure of 15.9 MPa. The whole project may last 60 years.

Case 2—Aquifer Straddling the HSZ (FIG. 8)

Figures 8A, 8B, 8C:
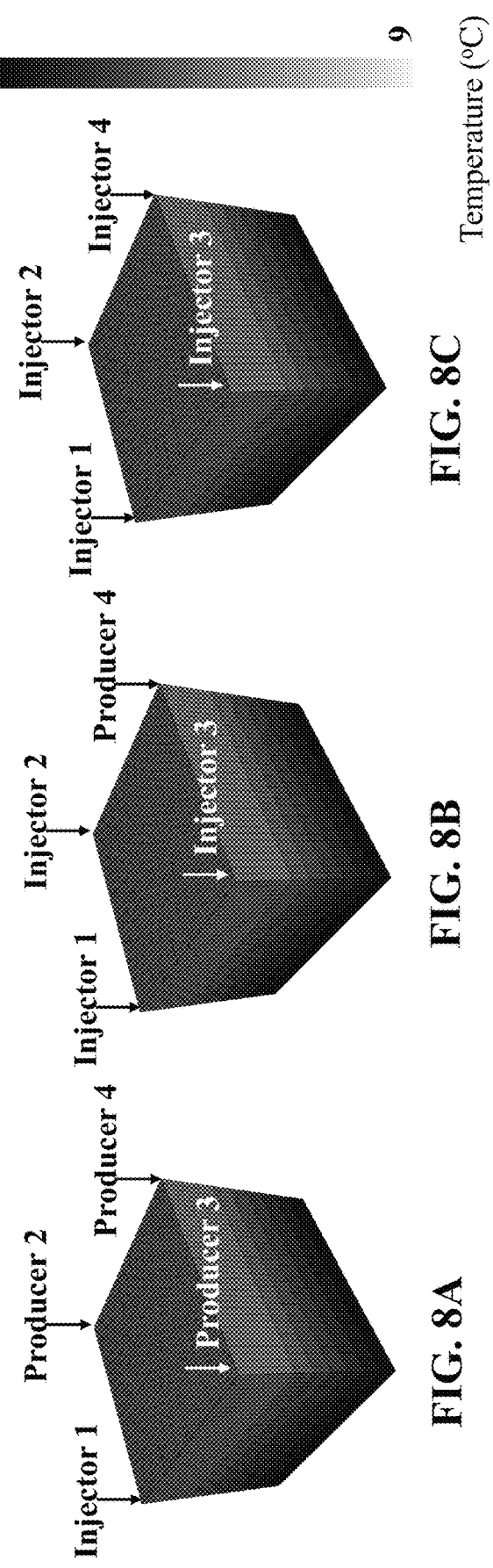
FIG. 8A-C display temperature profiles (in ° C.) of an aquifer straddling the hydrate stability zone in accordance with embodiments.

In Phase 1, covering 84 years from 2021 to 2105, $CO_2$ injector-1 exists in one corner of the aquifer model injecting $CO_2$ at 2,000 t/d (0.73 Mtpa); water producer-2, water producer-3, and water producer-4 exist at the other three corners of the aquifer model each producing water at 2,500 t/d (FIG. 8A). Phase 1 ends when $CO_2$ breaks through in water producer-2 and water producer-3 in 2105. In Phase 2, covering 97 years from 2105 to 2202, water producer-2 and water producer-3 are converted into $CO_2$ injector-2 and $CO_2$ injector-3, thus giving three $CO_2$ injectors with a total $CO_2$ injection rate of 3,000 t/d (1.1 Mtpa) and one producer producing water at 2,500 t/d (FIG. 8B). Phase 2 ends when $CO_2$ breaks through water producer-4 in 2202. In Phase 3, covering 19 years from 2202 to 2221, water producer-4 is converted to $CO_2$ injector-4 to give four injectors injecting $CO_2$ at a total rate of 4,000 t/d or 1.5 Mtpa (FIG. 8C). The simulation stops when the pressure in the top reservoir layer reaches the fracture pressure of 9.5 MPa. The whole project may last 200 years.

Case 3—Aquifer within the HSZ (FIG. 9)

Figure 9A:
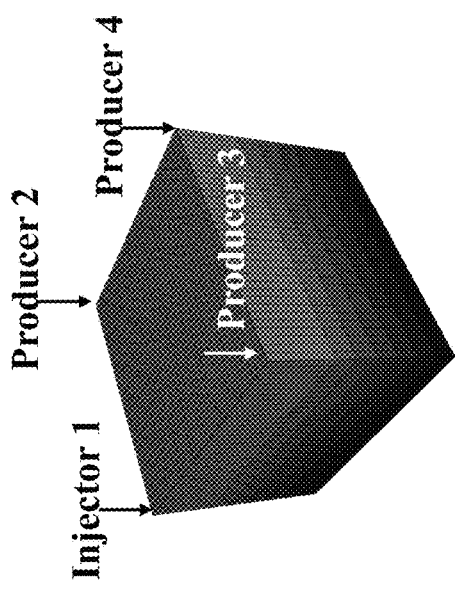
FIG. 9A-D display temperature profiles (in ° C.) of an aquifer located inside of the hydrate stability zone in accordance with embodiments.
Figure 9B:
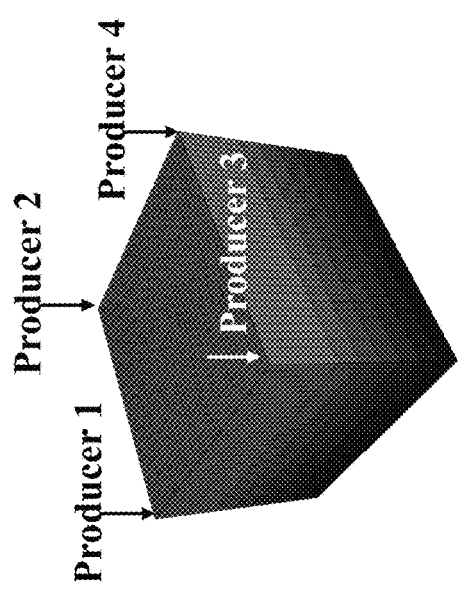
Figure 9C:
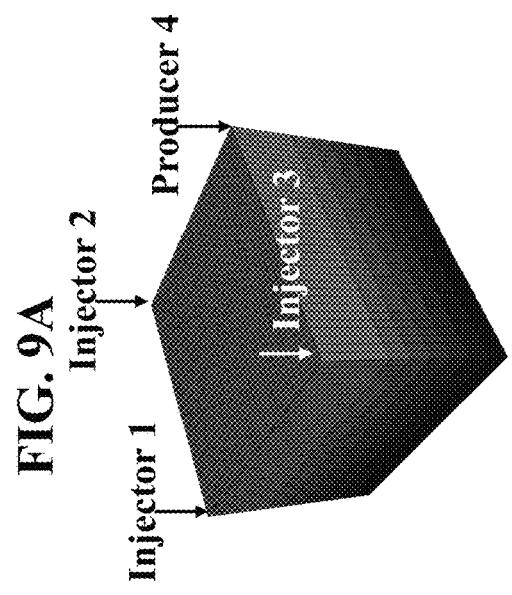
Figure 9D:
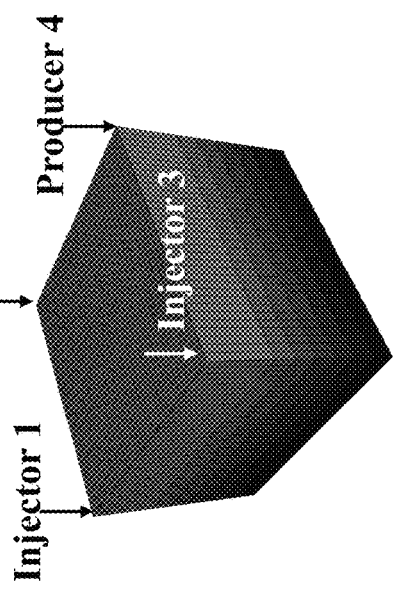

In Phase 1, covering one year from 2021 and 2022, all four corner water producers produce a total water rate of 20,000 t/d and a bottomhole pressure of 1.38 MPa (200 psi) (FIG. 9A). This phase ends when the reservoir pressure drops below 4 MPa in 2022 which is the $CO_2$ hydrate formation pressure corresponding to the second layer having a temperature of 8.2° C. (FIG. 1). In Phase 2, covering five years from 2022 and 2027, water producer-1 is converted to $CO_2$ injector-1 to give one injector injecting $CO_2$ at 2,000 t/d (0.73 Mtpa) and three water producers producing at a maximum rate of 15,000 t/d (FIG. 9B). Phase 2 ends when $CO_2$ breaks through in water producer-2 and water producer-3 in 2027. In Phase 3, covering 2027 to 2166, water producer-2 and water producer-3 are converted to $CO_2$ injectors to give three $CO_2$ injectors with a maximum injection rate of 2,000 t/d (1.1 Mtpa) and one water producer with a maximum rate limit of 5,000 t/d (FIG. 9C). Phase 3 ends when $CO_2$ breaks through in water producer-4. In Phase 4, covering 2166 to 2185 (FIG. 9D), water producer-4 is converted to $CO_2$ injector-4 to give four $CO_2$ injectors with a maximum $CO_2$ injection rate of 4,000 t/d (1.5 Mtpa). Phase 4 ends when the reservoir pressure reaches 5 MPa which is the $CO_2$ hydrate formation pressure corresponding to the bottom (sixth) reservoir layer having a temperature of 9.7° C. (FIG. 1). The whole project may last 164 years.

In embodiments, all wells are perforated throughout the aquifer (second through sixth layers). The wellbore constraints in different phases for the three cases are provided in Table 4. It is noted that the $CO_2$ injection temperature is set at 15° C. for all three cases.

The simulations may compare $CO_2$ storage with and without $CO_2$ hydrate formation. It is noted that the solubility of $CO_2$ in the water phase and reactions between dissolved $CO_2$ with reservoir rock are not considered as they usually take a very long time to come to completion.

TABLE 4

Simulation cases and well constraints

| | Cases | | |
|---|---|---|---|
| | Case 1 | Case 2 | Case 3 |
| | | Well constraints | |
| | Aquifer outside HSZ | Aquifer straddling HSZ | Aquifer inside HSZ |
| Phase 1 | 2021-2026 (5 yr) | 2021-2105 (84 yr) | 2021-2022 (1 yr) |
| Injectors | 1 | 1 | 0 |
| Producers | 0 | 3 | 4 |
| Injector pressure (MPa) | 15.9 | 9.8 | |

TABLE 4-continued

Simulation cases and well constraints

| | Cases | | |
|---|---|---|---|
| | Case 1 | Case 2 | Case 3 |
| | Well constraints | | |
| | Aquifer outside HSZ | Aquifer straddling HSZ | Aquifer inside HSZ |
| $CO_2$ injection rate (t/d) | 2,000 | 2,000 | |
| Producer pressure (MPa) | | 1.38 | 1.38 |
| Total water production rate (t/d) | | 2,500 | 20,000 |
| End of the phase | Pressure = 15.9 MPa | $CO_2$ breakthrough | Pressure = 4 MPa |
| Phase 2 | 2026-2044 (18 yr) | 2105-2202 (97 yr) | 2022-2027 (5 yr) |
| Injectors | 1 | 3 | 1 |
| Producers | 3 | 1 | 3 |
| Injector pressure (MPa) | 15.9 | 9.8 | 8.9 |
| $CO_2$ injection rate (t/d) | 2,000 | 3,000 | 2,000 |
| Producer pressure (MPa) | 1.38 | 1.38 | 1.38 |
| Total water production rate (t/d) | 6,000 | 2,500 | 15,000 |
| End of the phase | $CO_2$ breakthrough | $CO_2$ breakthrough | $CO_2$ breakthrough |
| Phase 3 | 2044-2066 (22 yr) | 2202-2221 (19 yr) | 2027-2166 (139 yr) |
| Injectors | 3 | 4 | 3 |
| Producers | 1 | 0 | 1 |
| Injector pressure (MPa) | 15.9 | 9.8 | 8.9 |
| $CO_2$ injection rate (t/d) | 3,000 | 4,000 | 3,000 |
| Producer pressure (MPa) | 1.38 | | 1.38 |
| Total water production rate (t/d) | 5,000 | | 5,000 |
| End of the phase | $CO_2$ breakthrough | Pressure = 9.8 MPa | $CO_2$ breakthrough |
| Phase 4 | 2066-2081 (15 yr) | | 2166-2185 (19 yr) |
| Injectors | 4 | | 4 |
| Producers | 0 | | 0 |
| Injector pressure (MPa) | 16 | | 8.9 |
| $CO_2$ injection rate (t/d) | 4,000 | | 4,000 |
| End of the phase | Pressure = 15.9 MPa | | Pressure = 5 MPa |
| Injected $CO_2$ temperature (° C.) | 15 | 15 | 15 |
| Total number of years | 60 | 200 | 164 |

Figure 10:
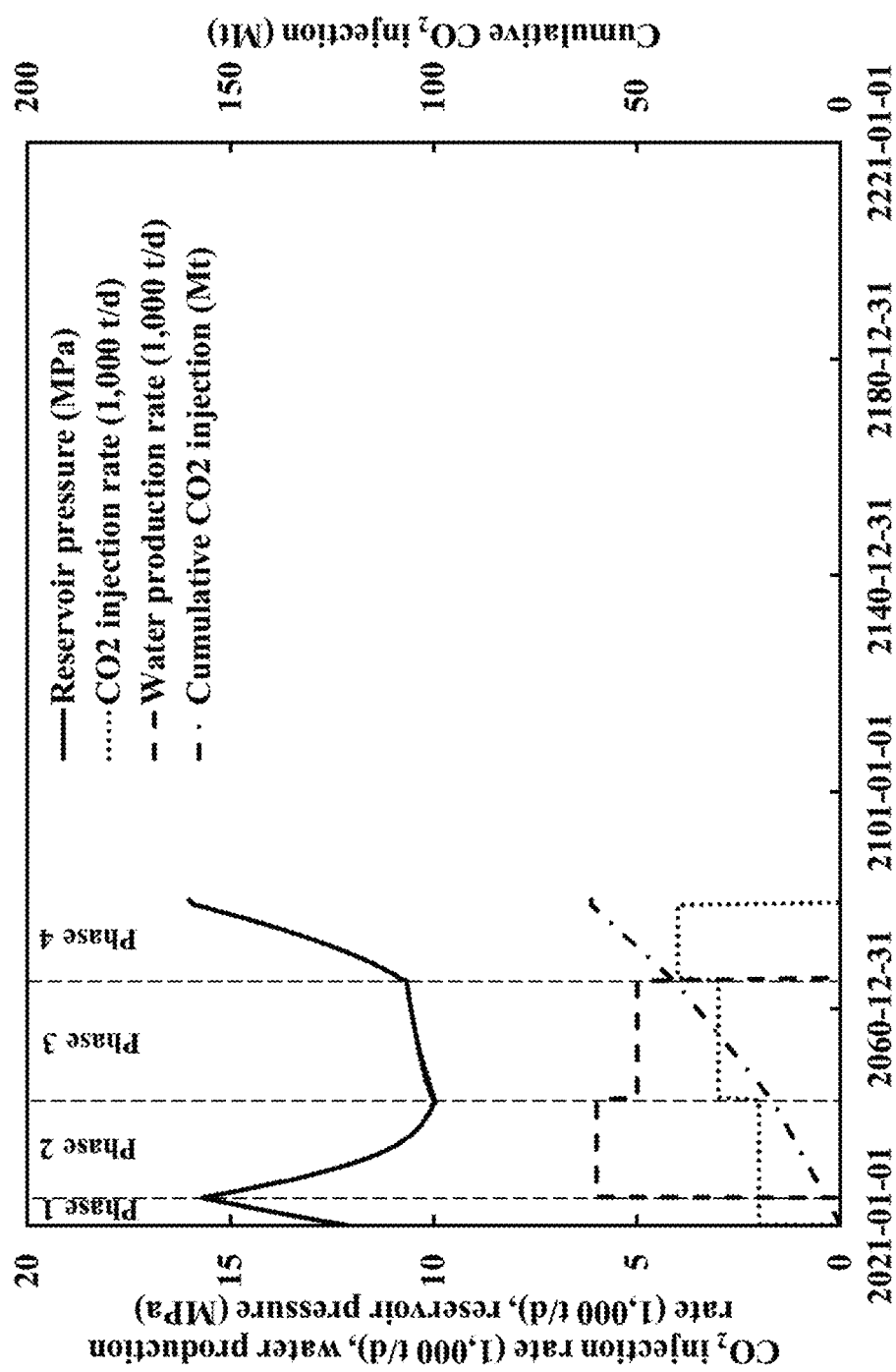
FIG. 10 displays a graphical presentation of simulation results of an aquifer outside of a hydrate stability zone injected with $CO_2$ and with water production in accordance with embodiments.
Figure 11:
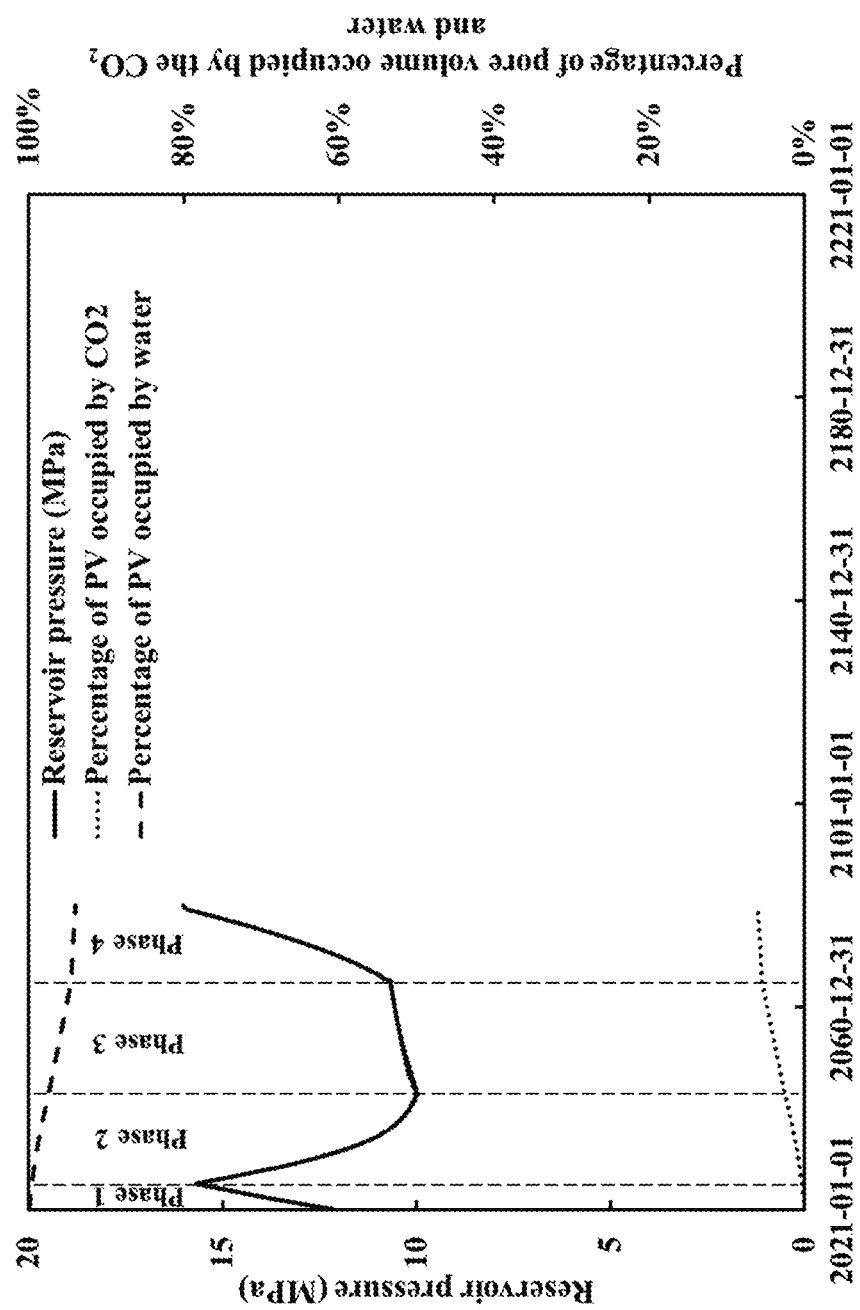
FIG. 11 displays a graphical presentation of simulation results of an aquifer outside of a hydrate stability zone showing the saturation and pressure change during $CO_2$ injection in accordance with embodiments.

Simulation results for Case 1 are shown in FIGS. 10 and 11. As seen in FIG. 10, the reservoir pressure increases when $CO_2$ is injected in Phase 1 (2021-2026). As seen in FIG. 11, the $CO_2$ saturation increases while the water saturation decreases. Phase 2 (2026-2044) begins when the reservoir pressure reaches the fracture pressure of the reservoir. Once the water production starts, the reservoir pressure decreases. When the $CO_2$ breaks through in producer-2 and producer-3, they are converted to $CO_2$ injectors to prevent recycling of $CO_2$ from the injectors to producers. In Phase 3 (2044-2066), there are three $CO_2$ injectors; as more $CO_2$ is injected and less water is produced, the pressure starts to rise. The $CO_2$ breaks through water producer-4 in 2066 and it is converted to a $CO_2$ injector. Continuous $CO_2$ injection in Phase 4 (2066-2081) raises the reservoir pressure until the fracture pressure is reached in 2081. The water saturation continuously decreases during $CO_2$ injection over 60 years (see FIG. 11). The $CO_2$ saturation increases up to 6% of PV in 2081 when the project is planned to be terminated. This result is consistent with other works on $CO_2$ storage in aquifers, with an efficiency factor ranging from 1-6% PV.

Figure 12:
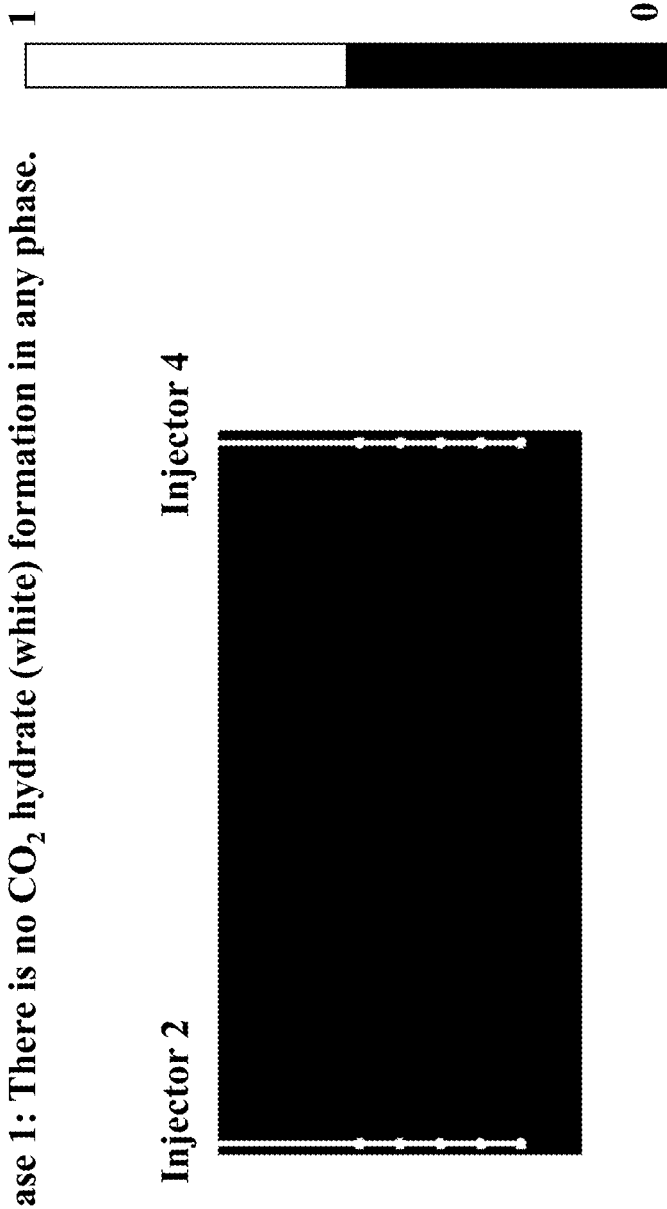
FIG. 12 displays cross-section view of an aquifer without a hydrate stability zone (Case 1) showing fraction of pore volume occupied by $CO_2$ hydrate at the end of Phase 4 in 2081.

The $CO_2$ hydrate saturation in the cross-section of the aquifer model of Case 1 from Injector 2 to Injector 4 (FIGS. 7A-7D) in 2081 is shown in FIG. 12. It is noted that there is no $CO_2$ hydrate formation at the end of Phase 4 in 2081.

In Phase 1, the simulation begins in 2021 with the aquifer fully saturated with water; there is no $CO_2$ in the aquifer initially. When the reservoir pressure reaches the reservoir fracture pressure in 2026, 3.65 Mt (Million tons) of $CO_2$ has been injected into the aquifer, which amounts to 0.4% PV. In Phase 2, three water producers are added into the simulation in 2026 in order to reduce the reservoir pressure. The injected $CO_2$ may occupy only a small part of the aquifer and may stay mostly around $CO_2$ injector-1; there is no $CO_2$ seen in the cross-section from producer-2 to producer-4 (FIG. 7B). In Phase 3, when $CO_2$ starts to break through in water producer-2 and water producer-3, they are converted to $CO_2$ injectors in 2044. In Phase 4, when the injected $CO_2$ starts to break through in water producer-4, it is converted to water injector-4 in 2066. When the reservoir pressure reaches the reservoir fracture pressure, the project is terminated in 2081. There is no $CO_2$ hydrate formed in 2081 is shown in FIG. 12. The injected $CO_2$ only stays in the top layer of the aquifer because of gravity segregation.

Figure 13:
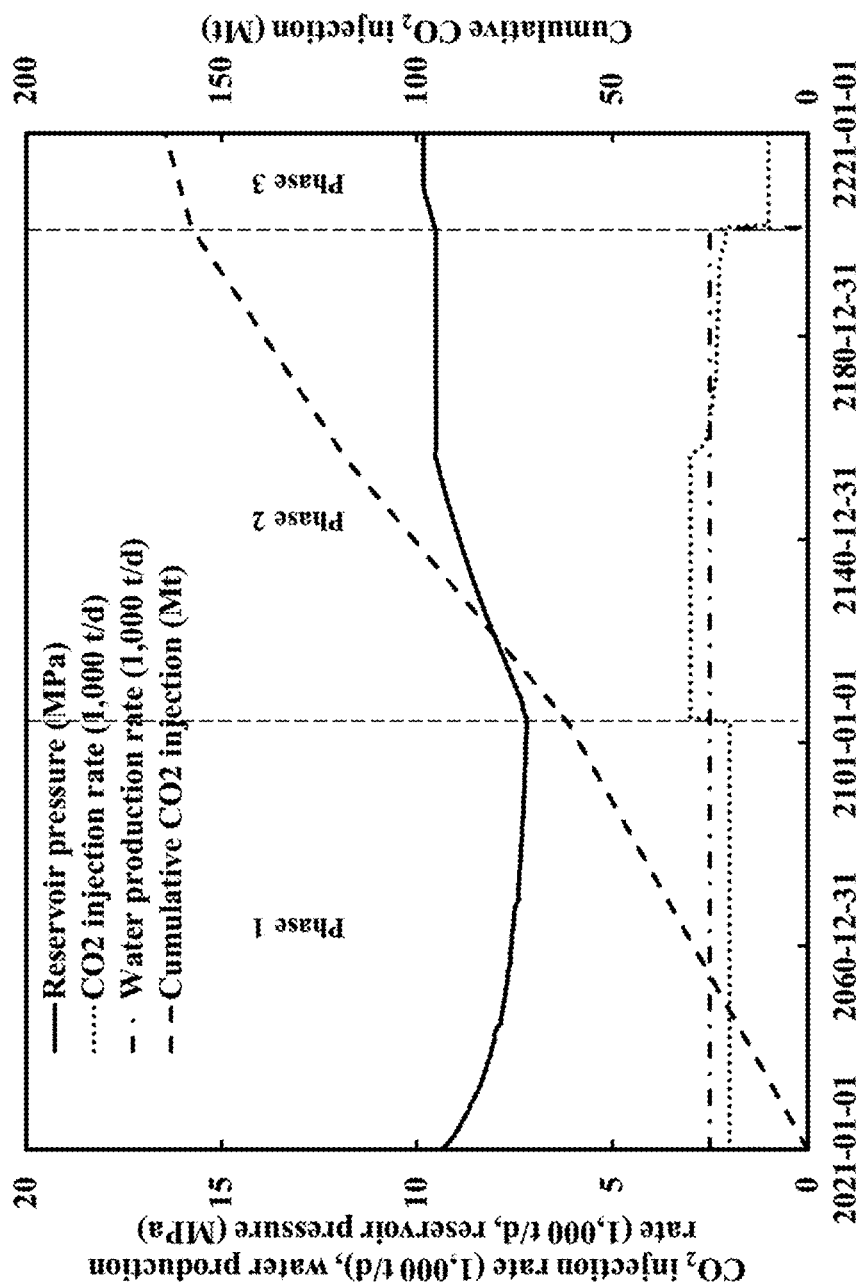
FIG. 13 displays a graphical presentation of simulation results of an aquifer straddling a hydrate stability zone injected with $CO_2$ and including water production in accordance with embodiments.
Figure 14:
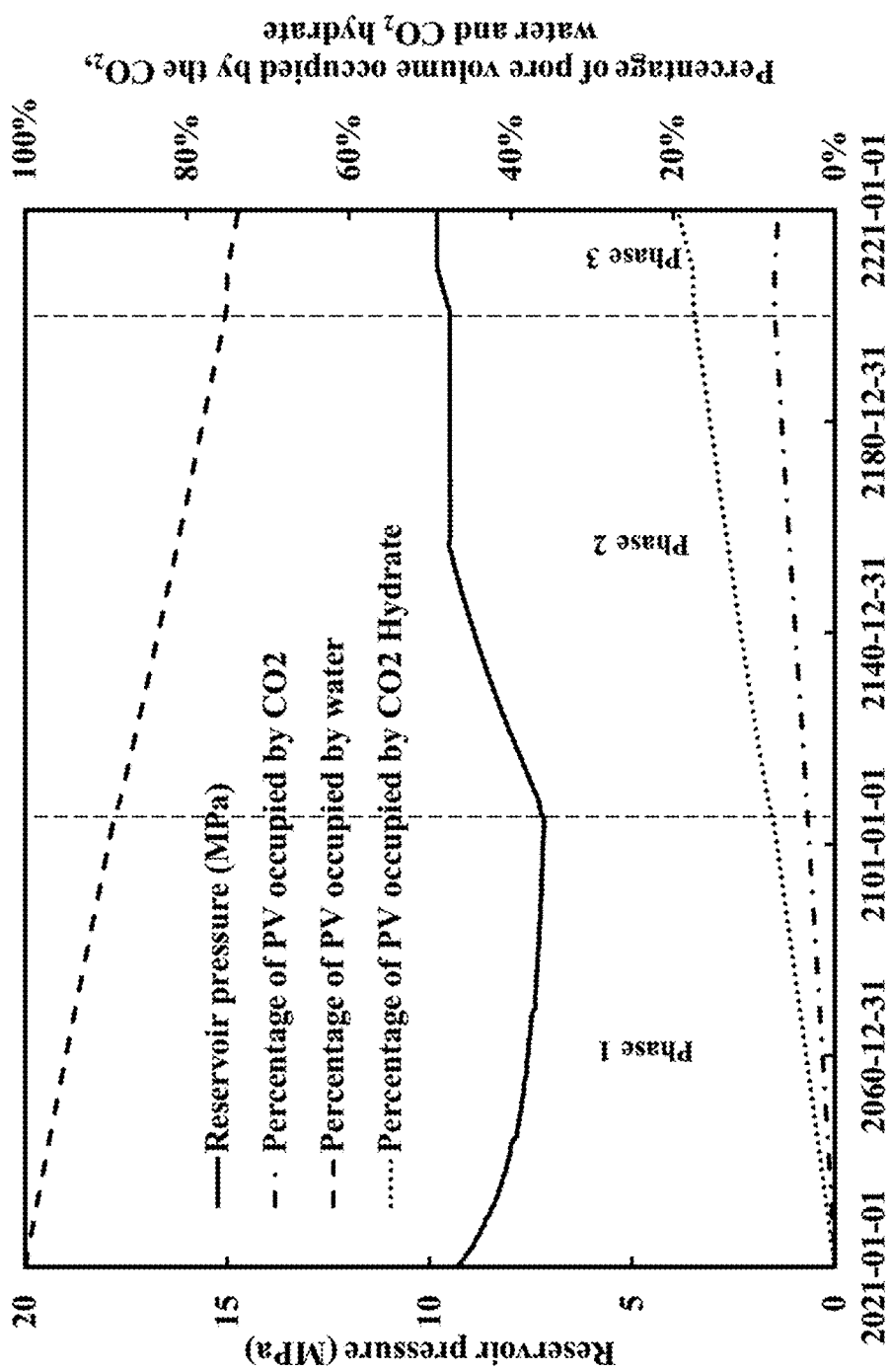
FIG. 14 displays a graphical presentation of simulation results of an aquifer straddling a hydrate stability zone showing the percent of pore volume occupied by $CO_2$, water, and $CO_2$ hydrate in relation to pressure change in accordance with embodiments.

For an aquifer straddling the HSZ corresponding to Case 2, $CO_2$ can be continuously injected into the fifth and sixth layers because they are outside the HSZ. The simulation results are shown in FIG. 13. In Phase 1 (2021-2105), $CO_2$ is injected at a constant rate of 2,000 t/d (0.73 Mtpa) while the three producers produce water a total rate of 2,500 t/d; the reservoir pressure decreases with time. $CO_2$ hydrate forms around $CO_2$ injector-1 once the $CO_2$ injection starts (FIG. 14) and delays $CO_2$ transport in the aquifer. The $CO_2$ front breaks through in water producer-2 and water producer-3 in 2105, after 84 years of $CO_2$ injection. At that time Phase 2 begins. Water producers 2 and 3 are converted into injectors to give three $CO_2$ injectors and one water producer (FIG. 8B). The total $CO_2$ injection rate increases to 3,000 t/d (1.1 Mtpa) for three injectors and the water production rate remains at 2,500 t/d. The reservoir pressure starts to rise in 2105. The injector bottomhole pressure constraint limits the $CO_2$ injectivity in 2158. The $CO_2$ injection rate is equal to the water production rate in 2158. The reservoir pressure increases very little between 2158 and 2202. Once $CO_2$ breaks through in water producer-4 in 2202, it is converted into $CO_2$ injector-4 to give four $CO_2$ injectors (FIG. 8C). The total $CO_2$ injection rate constraint is set to 4,000 t/d (1.5 Mtpa) for four injectors and there is no more water production. However, the $CO_2$ injectivity is limited by the injector bottomhole pressure to a rate of 1,000 t/d (0.37 Mtpa) for four wells. In Phase 3, the reservoir pressure increases rapidly between 2202 to 2210 and then slowly between 2210 and 2221. Between 2202 to 2210, the pressure rises because of continuous $CO_2$ injection with no water production. Most of the $CO_2$ is injected from injector 1 where there is no free water and therefore no $CO_2$-hydrate is formed (see FIG. 14). Between 2210 and 2221, free $CO_2$ travels from injector 1 to injector 4 where there is water; the water reacts with $CO_2$ to form $CO_2$ hydrate. The rate of pressure increase becomes very slow due to the 12% volume shrinkage during formation of $CO_2$ hydrate at reservoir conditions (Table 5). The reduced speed of pressure rise caused by $CO_2$ hydrate formation is consistent with those observed in other literature. When the reservoir pressure reaches the reservoir fracture pressure of 9.8 MPa in 2221, the projected is terminated. The simulation may last 200 years and the cumulative $CO_2$ injected is 164 Mt.

TABLE 5

Volume changes during $CO_2$ hydrate reactions

| Components | Mole | Volume at standard conditions (m$^3$) | Volume at reservoir condition (m$^3$) |
| --- | --- | --- | --- |
| $CO_2$ | 1 | 2.24 × 10$^{-2}$ | 0.45 × 10$^{-4}$ |
| $H_2O$ | 6 | 1.08 × 10$^{-4}$ | 1.08 × 10$^{-4}$ |
| $CO_2$ hydrate | 1 | 1.34 × 10$^{-4}$ | 1.34 × 10$^{-4}$ |

Figure 15:
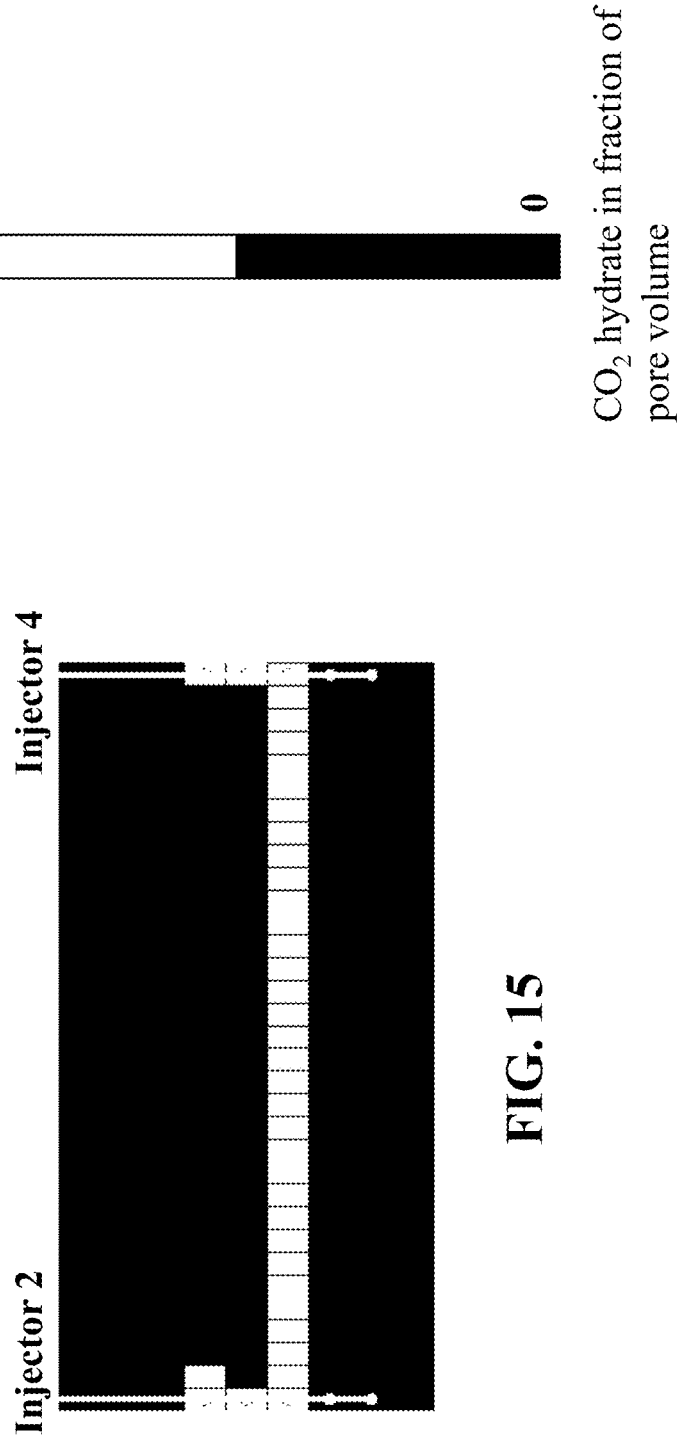
FIG. 15 displays a cross-section view of an aquifer model straddling a hydrate stability zone (Case 2) showing the fraction of pore volume occupied by $CO_2$ hydrate at 2221.

As shown in FIG. 15, a cross-section shows fraction of PV occupied by $CO_2$ hydrate from injector-2 to injector-4 (FIG. 8C) at 2221. The dark color indicates that very few $CO_2$ hydrate occupies the PV while the white color indicates that most PV is filled with $CO_2$ hydrate. Because $CO_2$ hydrate is in a solid state, liquid $CO_2$ and water only account for the PV not occupied by the solid $CO_2$ hydrate. In Phase 1, the simulation starts in 2021 and the aquifer is fully saturated with water initially. The injected $CO_2$ reacts with water near the injector-1 to form $CO_2$ hydrate immediately in the second to fourth layers and reduces $CO_2$ injection into them. However, $CO_2$ may be injected into the fifth and sixth layers. $CO_2$ is injected from injector-1 between 2021 and 2105. Water production from producer-2, producer-3, and producer-4 reduces reservoir pressure. No $CO_2$ hydrate is seen in the cross-section from producer-2 to producer-4 because the $CO_2$ has not reached them. Phase 1 lasts 84 years because $CO_2$ hydrate formation reduces the $CO_2$ transport in the aquifer and delays the $CO_2$ breakthrough at the producers. Producer-2 and producer-3 are converted to injectors when $CO_2$ breaks through in 2105. In Phase 2, the $CO_2$ injected into the fifth and sixth layers rises to the fourth layer and reacts with the water to form $CO_2$ hydrate, blocking upward mitigation of $CO_2$ to the upper layers. The $CO_2$ hydrate formation starts around the injectors and then moves to the producers. Producer-4 is converted to injector-4 when $CO_2$ breaks through in 2202. In Phase 3, the second through fourth layers around the injector-4 are blocked once the $CO_2$ is injected. $CO_2$ can, however, be injected into the fifth and sixth layers. When the reservoir pressure reaches the reservoir fracture pressure in 2221, the simulation may be terminated. For the aquifer straddling the HSZ, the injected $CO_2$ reduces injectivity in the upper layers inside the HSZ and forces the $CO_2$ injection into the lower layers outside the HSZ. The injected $CO_2$ rises to the upper layers by gravity segregation to form a $CO_2$ hydrate further blocking the rise of $CO_2$ (FIG. 15).

In the simulations, the pore volume excludes volume occupied by the solid $CO_2$ hydrate; therefore, the $CO_2$ and water saturation add up to unity. It can be seen that $CO_2$ hydrate forms in the fourth layer (FIG. 15) and free $CO_2$ stays at the fifth layer.

Figure 16:
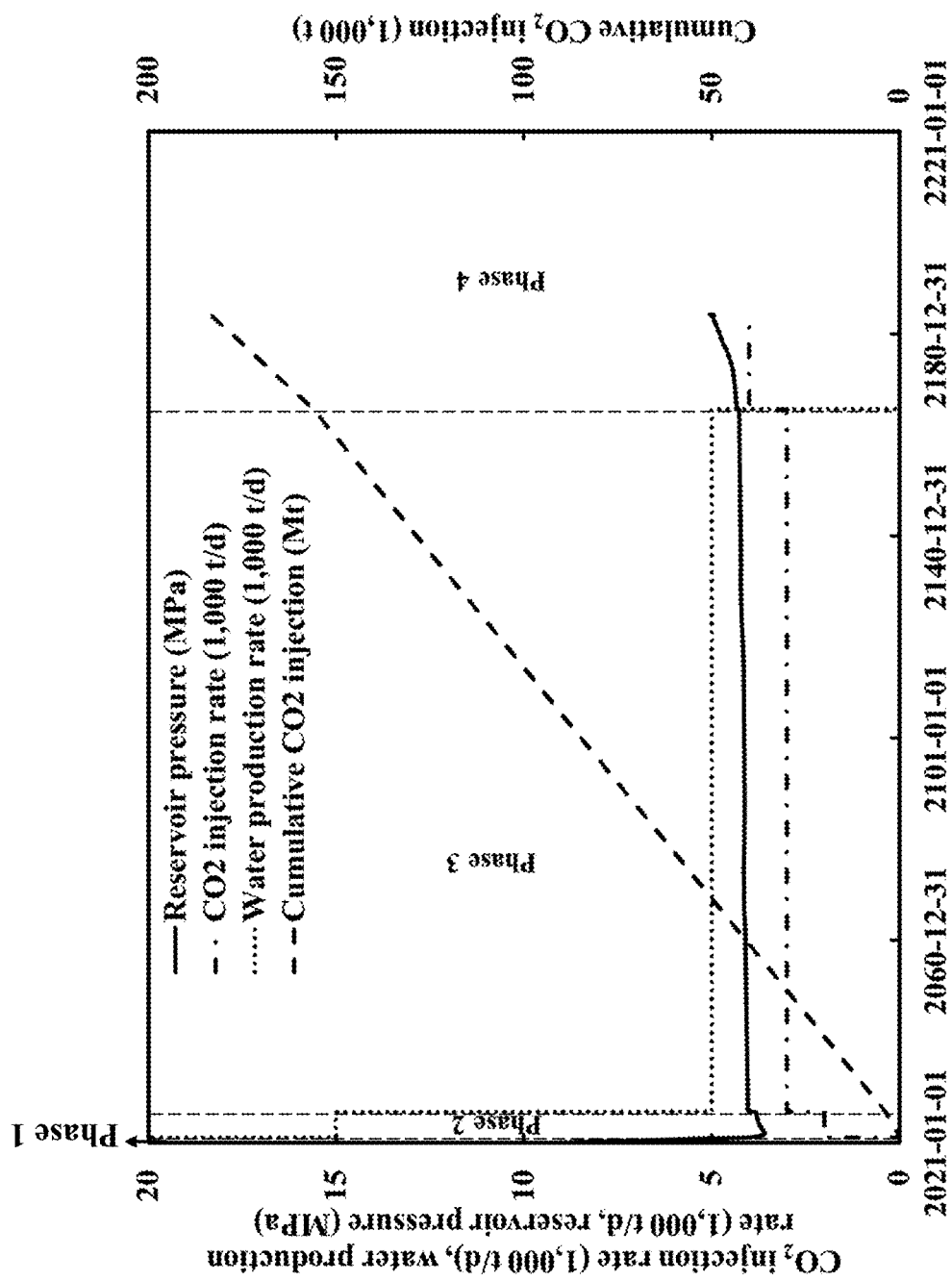
FIG. 16 displays a graphical presentation of simulation results of an aquifer inside a hydrate stability zone comparing the injection rates, production rates, and reservoir pressure in accordance with embodiments.
Figure 17:
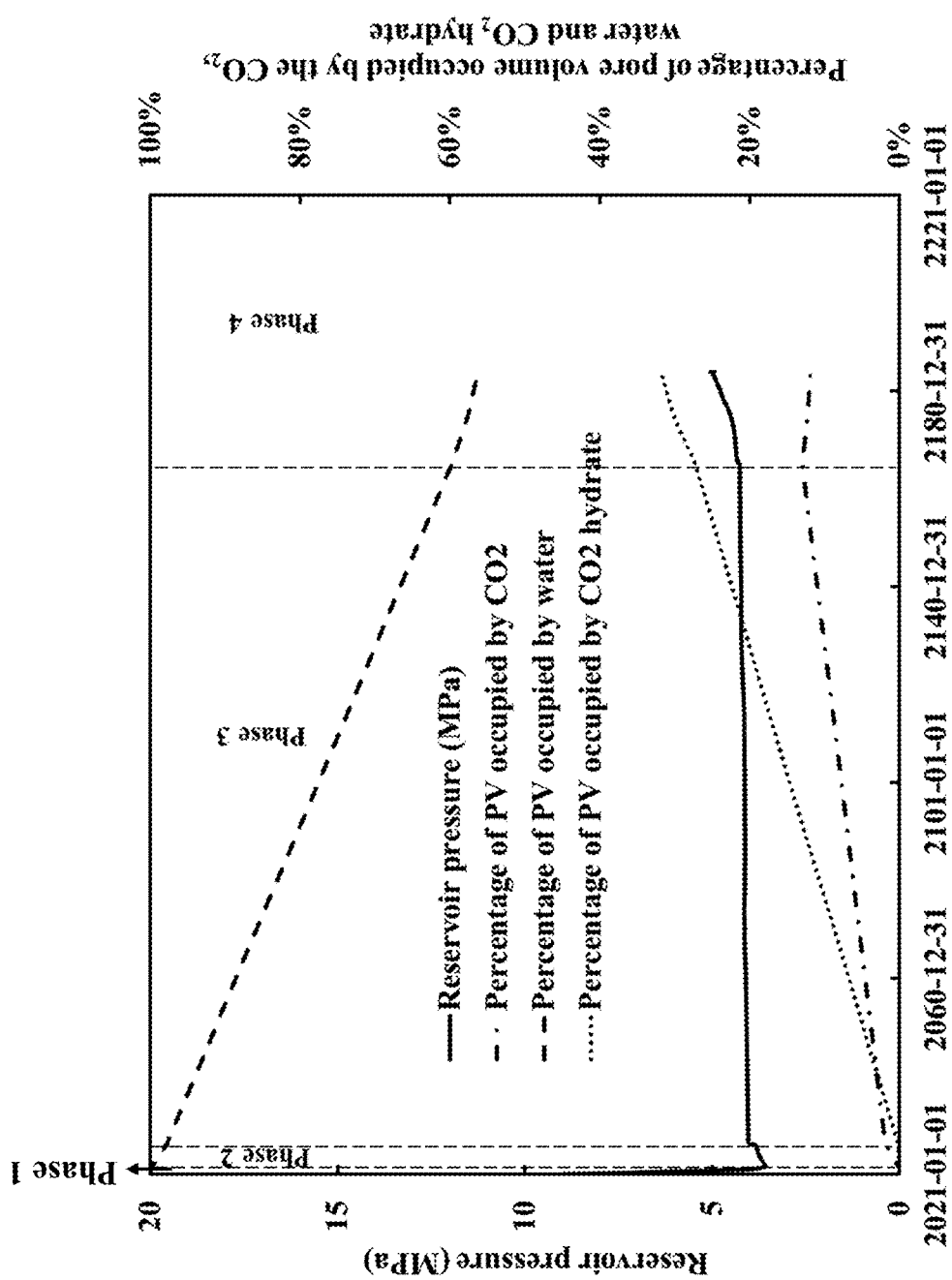
FIG. 17 displays a graphical presentation of simulation results of an aquifer inside a hydrate stability zone and showing the percent of pore volume occupied by $CO_2$, water, and $CO_2$ hydrate in relation to pressure change in accordance with embodiments.
Figure 18:
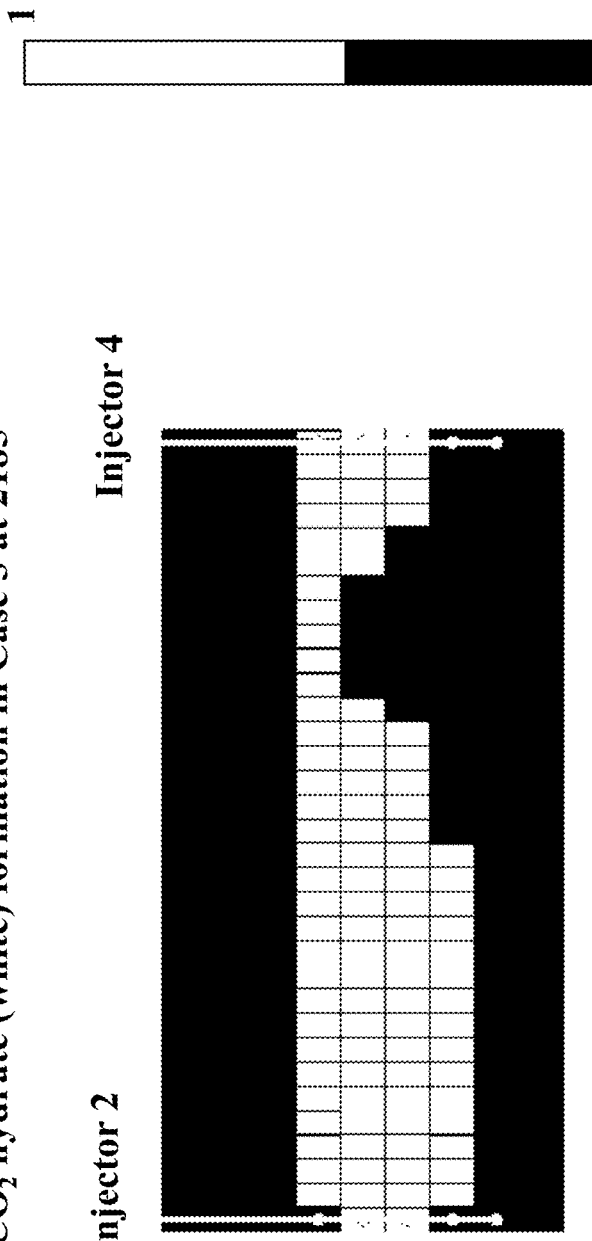
FIG. 18 displays a cross-section view of an aquifer model inside of a hydrate stability zone (Case 3) showing the fraction of pore volume occupied by $CO_2$ hydrate at 2185.

For Case 3 (aquifer inside of the HSZ), $CO_2$ hydrate can form in all layers. $CO_2$ cannot be injected into the aquifer from the very beginning because the $CO_2$ hydrate formation reduces injectivity. In Phase 1, the four corner wells are producers with a total water production rate of 20,000 t/d (5,000 t/d per well). Water production may reduce the reservoir pressure until 4 MPa is reached after one year (FIG. 16). This is the $CO_2$ hydrate formation pressure corresponding to a temperature of 8.5° C. (Table 1) in the second layer. In Phase 2, water producer-1 is converted to $CO_2$ injector-1 in 2022. $CO_2$ is injected at a rate of 2,000 t/d (0.73 Mtpa) and the total water production rate by the three producers is limited to 15,000 t/d. The reservoir pressure first decreases due to the continuous water production and then slowly increases due to $CO_2$ injection between 2022 and 2027. When the reservoir pressure drops below 4 MPa, which is the $CO_2$ hydrate phase boundary for the second layer, no $CO_2$ hydrate is formed by 2027 (FIG. 18). When $CO_2$ starts to break through in water producer-2 and water producer-3, they are converted to $CO_2$ injectors in 2027. In Phase 3, the total $CO_2$ injection rate increases to 3,000 t/d for three $CO_2$ injectors and the water production rate is 5,000 t/d in producer-4. The reservoir pressure rises slowly until the $CO_2$ hydrate formation pressure is reached. $CO_2$ hydrate starts to form between 2027 and 2166. The $CO_2$ hydrate encloses the free $CO_2$ and delays $CO_2$ breakthrough in water producer-4 until 2166. In Phase 4, water producer-4 is converted to $CO_2$ injector-4 to give four $CO_2$ injectors with a total $CO_2$ injection rate of 4,000 t/d. There is no water production between 2166 and 2185. As discussed before, the $CO_2$ and water reservoir volume shrink during $CO_2$ hydrate formation. The heat released by $CO_2$ hydrate formation and the continuous $CO_2$ injection without any production force the reservoir pressure to increase slowly between 2166 and 2175. In 2175, there is inadequate water to react with $CO_2$ to form $CO_2$ hydrate in the aquifer. Therefore, the pressure increases rapidly. The lower layers of the aquifer are hotter than the upper layers due to the geothermal gradient. $CO_2$ hydrate formation begins to occur in the lower layers and the reservoir pressure increases due to $CO_2$ injection. The percent of PV occupied by $CO_2$ decreases in FIG. 17 due to the formation of $CO_2$ hydrate in the lower layers. When the reservoir pressure reaches 5 MPa in 2185, which is the $CO_2$ hydrate formation pressure corresponding to the temperature of 9.7° C. in the sixth layer, the project is terminated because the $CO_2$ hydrate blocks all injectivity. The simulation may last 164 years and the cumulative $CO_2$ injected is 183 Mt.

A cross-section from injector-2 to injector-4 shows the percent of PV occupied by $CO_2$ hydrate (FIG. 18). The simulation starts in 2021 when the aquifer is fully saturated with water initially. $CO_2$ hydrate forms from the top to the bottom of the aquifer inside the HSZ. In Phase 1, all four wells are water producers to reduce the reservoir pressure between 2021 and 2022. In Phase 2, the reservoir pressure decreases to 4 MPa, which is the $CO_2$ hydrate formation pressure corresponding to the temperature of 8.5° C. in the second layer. No $CO_2$ hydrate forms between 2022 and 2027 in FIG. 18. In Phase 3, when $CO_2$ breaks through in water producer-2 and water producer-3 in 2027, they are converted to $CO_2$ injectors. At the end of Phase 3, there is more $CO_2$ hydrate near injector-2 than injector-4 (FIG. 18). There is more $CO_2$ hydrate in the upper layers than that in the lower layers because $CO_2$ travels mostly through the upper layers due to gravity segregation. The free $CO_2$ is surrounded by the $CO_2$ hydrate and travels slowly to the producers. It takes 139 years for $CO_2$ to break through in Phase 3 instead of five years in Phase 2. In Phase 4, water producer-4 is converted to $CO_2$ injector-4 in 2166. $CO_2$ hydrate forms from the corner to the center of the aquifer. When the reservoir pressure reaches 5 MPa in 2185, which is the $CO_2$ hydrate formation pressure corresponding to the temperature of 9.7° C. in the sixth layer, the simulation is terminated.

Simulation results for all three cases are given in Table 6. The project lasts for 60, 200, and 164 years for Cases 1, 2 and 3, respectively. In the aquifers straddling the HSZ and inside the HSZ, although formation of $CO_2$ hydrate reduces the $CO_2$ injectivity, it delays $CO_2$ breakthrough and lengthens the project, resulting in more $CO_2$ being injected. In order to manage the reservoir pressure, $CO_2$ injection and water production are controlled. This is key to achieve adequate $CO_2$ injectivity.

TABLE 6

Summary of simulation results for all three aquifers

|  | Aquifer type | | |
| --- | --- | --- | --- |
|  | Aquifer without a HSZ | Aquifer straddling HSZ | Aquifer inside HSZ |
| Duration of project (yr) | 60 | 200 | 164 |
| Total $CO_2$ storage in mass (Mt) | 61 | 164 | 183 |
| $CO_2$ stored as free $CO_2$ in mass (Mt) | 61 | 88 | 97 |
| $CO_2$ stored as hydrated in mass (Mt) | 0 | 76 | 86 |
| Cumulative water produced (Mt) | 84 | 174 | 304 |
| $CO_2$ stored as free $CO_2$ in PV (%) | 6 | 7 | 11 |
| $CO_2$ stored as $CO_2$ hydrate in PV (%) | 0 | 5 | 10 |
| $CO_2$ stored in PV (%) | 6 | 12 | 21 |
| Cumulative $CO_2$ stored/water produced (Mt/Mt) | 0.73 | 0.94 | 0.60 |

In the aquifer without a HSZ, the mobility of $CO_2$ is much higher than that of water so $CO_2$ travels readily from the injector to producer. Once the $CO_2$ breaks through in the producers, they are converted to $CO_2$ injectors to prevent $CO_2$ recycling. $CO_2$ injection has to be terminated when the reservoir pressure reaches the fracture pressure to prevent $CO_2$ leakage.

The volume ratio of $CO_2$ to $H_2O$ to form $CO_2$ hydrate is 1:2.4 at the reservoir conditions with a hydration number of 6. Therefore, $CO_2$ stored as the $CO_2$ hydrate accounts for 30% of total $CO_2$ hydrate volume. The total $CO_2$ stored in the aquifer without a HSZ, straddling the HSZ, and inside the HSZ are 61 Mt (6% PV), 164 Mt (12% PV) and 183 Mt (21% PV), respectively. However, the total amount of water produced is 84 Mt, 174 Mt and 304 Mt for Cases 1, 2 and 3, respectively (Table 6).

Figure 19:
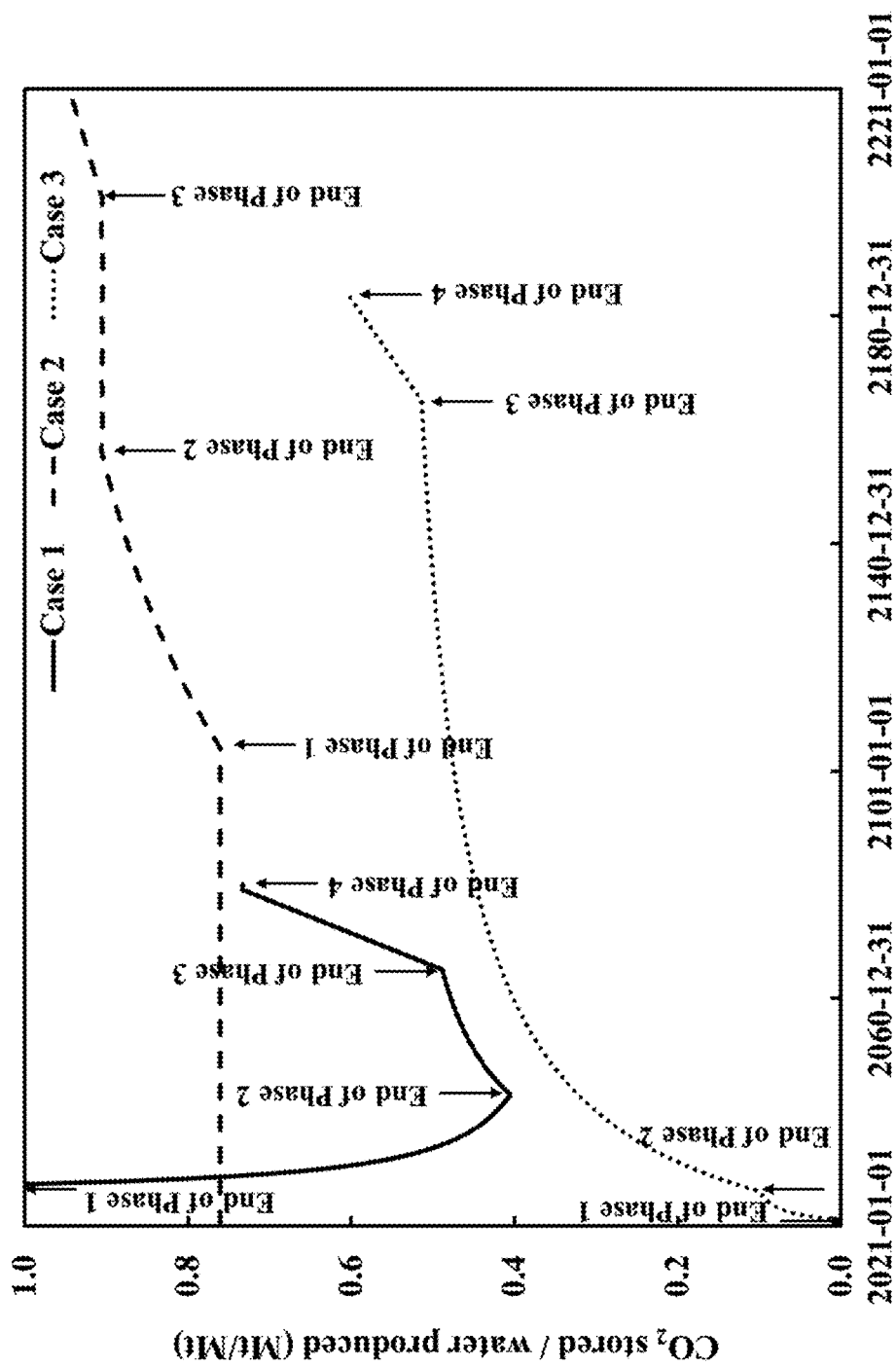
FIG. 19 displays a graphical presentation of the ratio of cumulative $CO_2$ stored in relation to water produced (Million tons/Million tons) for multiple aquifers in accordance with embodiments.

The ratio of $CO_2$ stored to water produced is shown in FIG. 19. For Case 1, there is $CO_2$ injection but no water production in Phase 1 (2021-2026). Once the water production starts in Phase 2 (2026-2044), the ratio of $CO_2$ stored to water produced decreases quickly. After two water producers are converted to $CO_2$ injectors in Phase 3 (2044-2066), the ratio of $CO_2$ stored to water produced begins to climb. In Phase 4 (2066-2081), $CO_2$ injection occurs but no water production and the ratio of $CO_2$ stored to water produced increases rapidly. In total, 61 Mt of $CO_2$ is stored and 84 Mt of water is produced giving 0.73 tons of $CO_2$ stored for every ton of water produced (Table 6).

For Case 2, both $CO_2$ injection and water production starts in Phase 1 (2021-2105) and the ratio of $CO_2$ stored to water produced is constant (see FIG. 19). In Phase 2 (2105-2202), two producers are converted to $CO_2$ injectors and the ratio of $CO_2$ stored to water produced increases. In 2158, the $CO_2$ injectivity is constrained by the fracture pressure limit. The $CO_2$ injection rate is reduced and is equal to the water production rate; the ratio of $CO_2$ stored to water produced is almost constant. In Phase 3 (2202-2221), there is $CO_2$ injection but no water production. The ratio of $CO_2$ stored to water produced increases to 0.94 when the reservoir fracture pressure is reached.

For Case 3, water production occurs but no $CO_2$ injection occurs in Phase 1 (2021-2022). When $CO_2$ injection commences in Phase 2 (2022-2027), the ratio of $CO_2$ stored to water produced increases. In Phase 3 (2027-2166), two water producers are converted into $CO_2$ injectors. The ratio of $CO_2$ stored to water produced continuously increases. In Phase 4 (2166-2185), $CO_2$ injection occurs but no water production. The ratio of $CO_2$ stored to water produced increases up to 0.6 at the end of the simulation.

Figure 20:
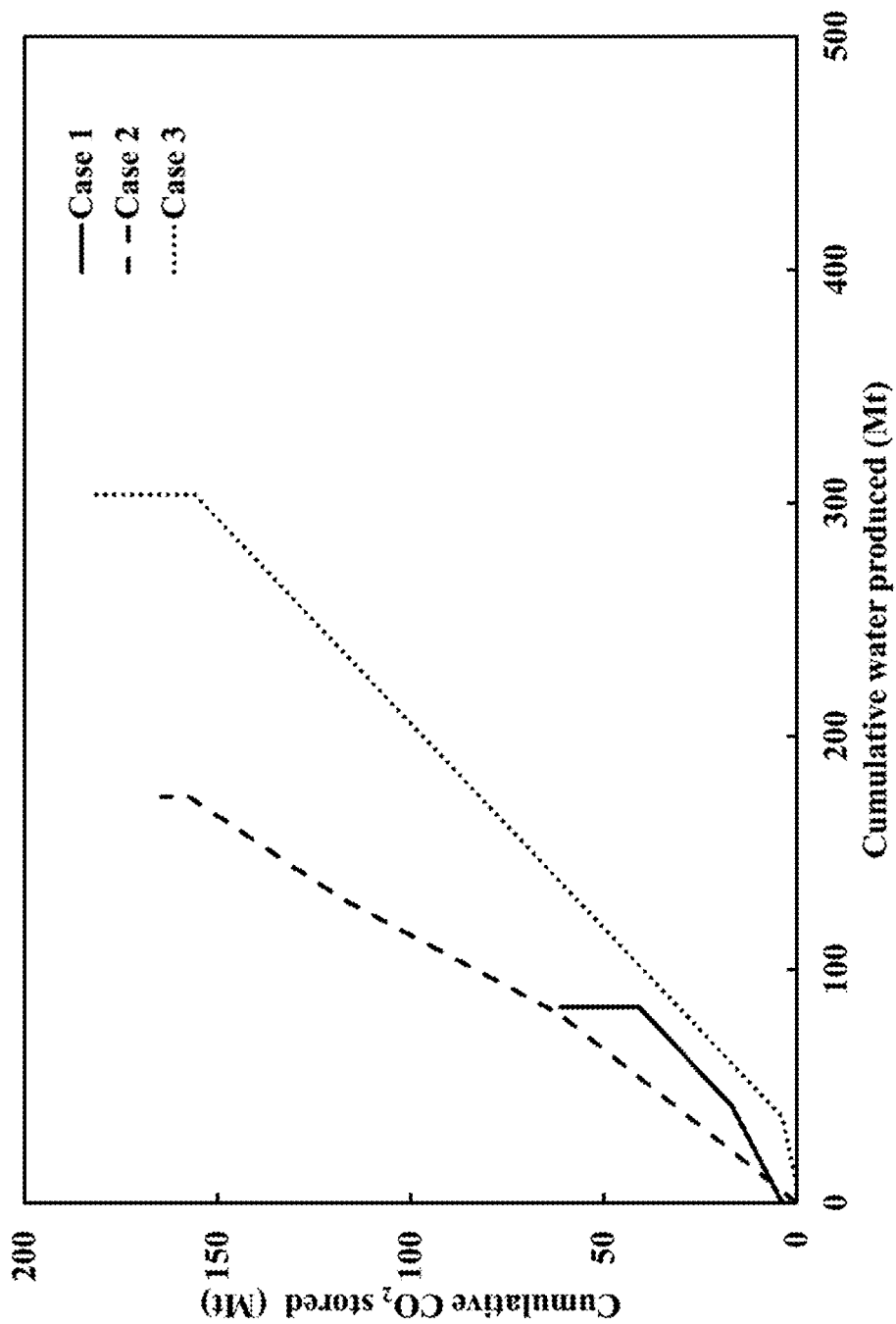
FIG. 20 displays a graphical presentation of the ratio of cumulative $CO_2$ stored in relation to cumulative water produced (Megatons/Megatons) for multiple aquifers in accordance with embodiments.

FIG. 20 displays the cumulative $CO_2$ stored versus cumulative water produced. Initially, there is no water production and only $CO_2$ injection in Case 1 between 2021 and 2026. Therefore, the starting point of Case 1 is not at zero water produced. On the other hand, for Cases 2 and 3, the starting point is at zero water produced. At the end of all cases, the curves become vertical because there is $CO_2$ injection but no water production. Of all the cases, Case 2 includes the highest cumulative $CO_2$ stored to water produced. This is partly because $CO_2$ density is higher at the reservoir condition in Case 2. Although the $CO_2$ density is the highest at initial reservoir conditions in Case 3, the reservoir pressure is reduced to below $CO_2$ hydrate formation pressure; the $CO_2$ density is therefore reduced.

The ratio of the cumulative amount of $CO_2$ stored to cumulative water produced is 0.73, 0.94 and 0.6 Mt/Mt for Cases 1, 2 and 3, respectively. The $CO_2$ density in the three cases is 0.65, 0.9 and 0.91 t/m3 at the initial reservoir pressure and temperature (FIG. 5). For Cases 1 and 2, the simulation is terminated when the reservoir pressure reaches the fracture pressure, which is higher than the initial reservoir pressure. This causes a higher $CO_2$ density. Therefore, the ratio of $CO_2$ stored to water produced is slightly higher than the $CO_2$ density at the initial reservoir condition. For Case 3, the reservoir pressure is reduced from the initial reservoir pressure of 8.7 MPa to the hydrate formation pressure of 5 MPa at the aquifer bottom. This causes the $CO_2$ density to drop. Consequently, the ratio of $CO_2$ stored to water produced is less then 0.91, which is the $CO_2$ specific density at initial reservoir conditions. The ratio of cumulative $CO_2$ stored to cumulative water produced is highly sensitive to the $CO_2$ density at reservoir conditions. More $CO_2$ is stored in Cases 2 and 3 than Case 1 due partly because more water is produced. Additionally, results indicate that more $CO_2$ can be stored in Case 2 per ton of water produced in the operation. Almost half of $CO_2$ stored in Cases 2 and 3 are in the form of hydrate (Table 6), which is immobile and acts as a barrier to post-injection $CO_2$ movement.

In addition to the total amount of $CO_2$ stored, the risk of $CO_2$ leakage from the aquifer is also investigated. The permeability of the caprock and underburden ranges from $1 \times 10^{-5}$ md to 1,000 md (Table 7) for all three aquifers and the aquifer permeability is kept constant at 3,000 md. All other parameters are kept the same. The horizontal and vertical permeability is assumed to be same in the simulation.

TABLE 7

$CO_2$ leakage simulations

| | Aquifer type | | |
|---|---|---|---|
| | Aquifer without a HSZ | Aquifer straddling HSZ | Aquifer inside HSZ |
| Caprock permeability (md) | 0.00001-1,000 | 0.00001-1,000 | 0.00001-1,000 |
| Aquifer permeability (md) | 3,000 | 3,000 | 3,000 |
| Underburden permeability (md) | 0.00001-1,000 | 0.00001-1,000 | 0.00001-1,000 |

Figure 21:
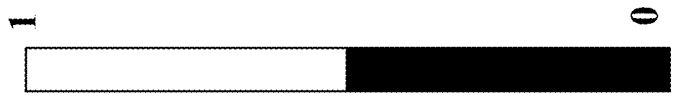
FIG. 21 displays a cross-section view of an aquifer model outside of a hydrate stability zone (Case 1) at 2081 showing the $CO_2$ leakage through a caprock in the aquifer in accordance with embodiments. (Unit: fraction)
Figure 21:
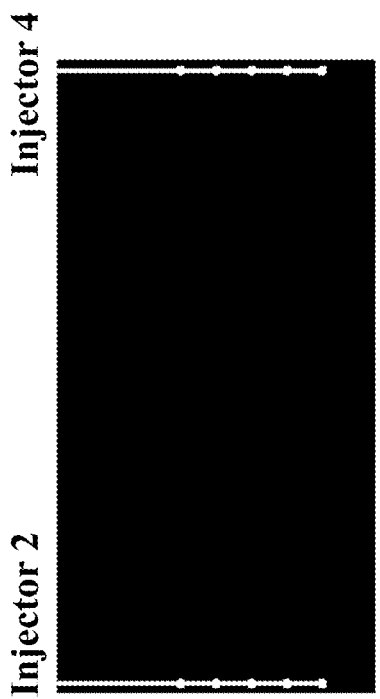

In Case 1, there is no $CO_2$ leakage through the caprock when its permeability is $1 \times 10^{-5}$ md as shown in FIG. 21. The underburden does not affect the results due to gravity segregation. When the caprock permeability changes to $1 \times 10^{-4}$ md, $CO_2$ starts to leak through the caprock (FIG. 21). Therefore, a caprock permeability of $1 \times 10^{-5}$ md or less is needed to avoid any $CO_2$ leakage.

Figure 22:
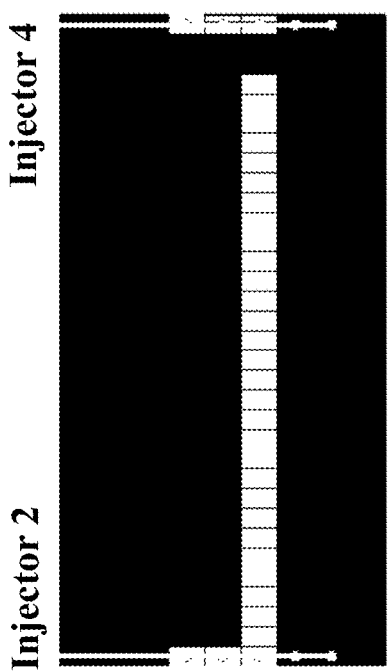
FIG. 22 displays a cross-section view of an aquifer model straddling a hydrate stability zone (Case 2) at 2221 showing the $CO_2$ leakage through a caprock in the aquifer with a permeability of 1,000 md in accordance with embodiments. (Unit: fraction)

For Case 2, FIG. 22 displays the fraction PV occupied by $CO_2$ hydrate and the $CO_2$ saturation in 2221. It can be seen from FIG. 22 that a layer of high $CO_2$ concentration (close to 100% PV) extends from injector-2 to injector-4 in layer 4 which blocks the upward migration of $CO_2$ in layer 5 (FIG. 22). When the caprock permeability increases to 1,000 md, there is no $CO_2$ leakage through the caprock because the $CO_2$ hydrate in layer 4 prevents upward migration of free $CO_2$ from layer 5. Therefore, $CO_2$ storage in an aquifer straddling HSZ (Case 2) is not limited by the caprock permeability.

Figure 23:
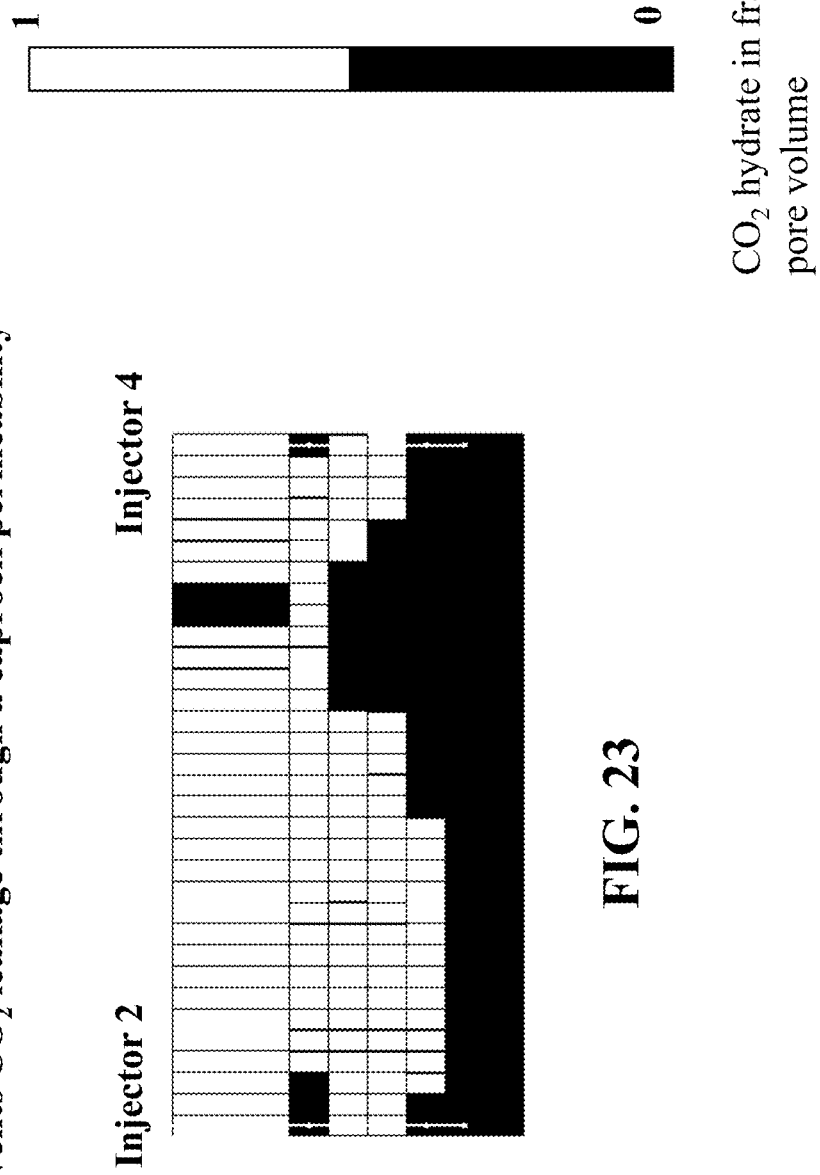
FIG. 23 displays a cross-section views of an aquifer model inside a hydrate stability zone (Case 3) at 2185 showing the $CO_2$ leakage through a caprock in the aquifer with a permeability of 0.1 md in accordance with embodiments. (Unit: fraction)

For Case 3, FIG. 23 and FIG. 24 show the PV occupied by $CO_2$ hydrate and the $CO_2$ saturation at different caprock permeabilities in 2185. When the caprock permeability is 0.1 md, some $CO_2$ hydrate forms in the caprock (FIG. 23) although there is no free $CO_2$ However, when the caprock permeability is 1 md, more $CO_2$ leaks through the caprock (FIG. 24). The $CO_2$ hydrate occupies 90% PV where the $CO_2$ hydrate is available while the rest of the 10% PV in the grid blocks is filled with water and free $CO_2$; some grid blocks are filled with half brine and half $CO_2$ and exclude the $CO_2$ hydrate PV. Because one mole of $CO_2$ requires six moles of $H_2O$ to form the $CO_2$ hydrate, the volume ratio of $CO_2$ and $H_2O$ is 1:2.4 at the reservoir condition as discussed above. As more and more $CO_2$ migrates to the caprock, there is not enough water to react with $CO_2$ to form $CO_2$ hydrate (FIG. 24). There is possibility for the free $CO_2$ to migrate somewhere else. Therefore, $CO_2$ storage in Case 3 requires a caprock with a permeability of 0.1 md or less versus $1 \times 10^{-5}$ for an aquifer in Case 1.

It is noted that this disclosure assumes a seawater hydrostatic gradient and a geothermal gradient typical of a tropical region. In polar regions, both are different and a HSZ can exists at shallower water depths. In addition, a HSZ can also exist in a permafrost on land. It is further noted that enough water is produced for the reservoir pressure to drop below the hydrate formation pressure and $CO_2$ injection begins as soon as practically feasible.

According to this disclosure, it may be possible to store $CO_2$ in a HSZ in an offshore aquifer wherein over half of the injected $CO_2$ can be immobilized as solid $CO_2$ hydrate. Although some of the injected $CO_2$ is stored as free $CO_2$, it is also practically immobilized as its movement is severely restricted due to blockage by the $CO_2$ hydrate. In order words, the relative permeability to free $CO_2$ is reduced due to the formation of $CO_2$ hydrate. This is highly advantageous as it prevents post-injection $CO_2$ migration. Furthermore, by careful management of reservoir pressure through water production and $CO_2$ injection, it is feasible to store a large amount of $CO_2$ (21% PV) in an aquifer inside the HSZ. This may have important ramifications for the design of $CO_2$ storage in saline aquifers.

Overall, it is shown that in a tropical region, a $CO_2$ hydrate stability zone exists below the seafloor when the water depth is above 630 meters. Within this HSZ, solid $CO_2$ hydrate can form and be thermodynamically stable. It has been previously understood that $CO_2$ cannot be injected into an aquifer in this HSZ because formation of solid $CO_2$ hydrate will impair $CO_2$ injectivity near the wellbore. As disclosed herein, it is shown that it is possible to inject $CO_2$ into an aquifer in the HSZ by carefully managing the reservoir pressure. If the pressure of the HSZ is reduced to that below the equilibrium pressure for $CO_2$ hydrate formation by water production, then $CO_2$ can be continuously injected. By manipulating water production with respect to $CO_2$ injection, the reservoir pressure can be managed. Reducing or stopping water production while keeping $CO_2$ injection may allow the reservoir pressure to rise. When the reservoir pressure rises to the equilibrium pressure for $CO_2$ hydrate formation, $CO_2$ will react with water to form solid $CO_2$ hydrate. Thus, some of the injected $CO_2$ will solidify as $CO_2$ hydrate and be immobilized. Furthermore, any remaining free $CO_2$ will also be prevented from further migration since it is surrounded by solid $CO_2$ hydrate. This method of sequestering $CO_2$ as $CO_2$ hydrate in the HSZ may have significant implications in the geological storage of anthropogenic $CO_2$ in offshore saline aquifers. In the tropical region, aquifers with a water depth less than 630 meters are considered too shallow for the existence of a HSZ. The situation is different in polar regions, where the surface temperature of the water is much lower (2° C.-12° C.). In this case, the seawater temperature profile intersects the $CO_2$ hydrate phase boundary at much shallower water depths (FIG. 3). Therefore, a HSZ can exist at water depths as shallow as 200 meters.

The followings can be concluded based on the aquifer models analyzed:

1. In tropical waters, a HSZ exists below the seafloor when the water depth exceeds 630 meters.

2. It is possible to store $CO_2$ in an aquifer residing inside the HSZ or straddling the HSZ through management of reservoir pressure by $CO_2$ injectors and water producers.

3. In an aquifer straddling the HSZ, $CO_2$ can be injected into the lower part of the aquifer below the HSZ. However, injected $CO_2$ migrates to the HSZ to form $CO_2$ hydrate which blocks further upward migration of $CO_2$.

4. In an aquifer inside the HSZ, reduction of reservoir pressure below the hydrate formation pressure by water production can allow $CO_2$ to be injected.

5. In both cases, hydrate formation delays $CO_2$ breakthrough and moderates the increase in reservoir pressure due to volume shrinkage thus allowing substantial amount of $CO_2$ (12-22% PV) to be stored. Furthermore, over half of the injected $CO_2$ is stored as immobilized solid $CO_2$ hydrate which also effectively blocks migration of the free $CO_2$. This substantially reduces the risk of post-injection $CO_2$ leakage through the caprock.

6. The aforementioned results demonstrate the potential of storing $CO_2$ inside the HSZ in a saline aquifer with the benefit of immobilizing the stored $CO_2$ due to the formation of solid $CO_2$ hydrate.

For the purposes of this disclosure, the terms "$CO_2$ hydrate", "carbon dioxide hydrate", and "hydrate" may be used interchangeably.

It is noted that a wellbore may be used either as a $CO_2$ injector or as a "producer" or a "water producer". It is further noted that an "injector" may generally inject $CO_2$ to a bottom of a wellbore and into an aquifer/reservoir whereas a "producer" is used to produce water from a wellbore and from an aquifer/reservoir. It is further noted that water "production" may refer to the extraction of water out of the aquifer/reservoir using one or more wellbores. Generally, water flows from the aquifer into the producer because the bottomhole pressure is lower than the aquifer pressure. Water flows up the producer wellbore because the surface pressure is lower than the bottomhole pressure.

Nomenclature

HSZ—$CO_2$ hydrate stability zone
PV—Pore volume, $m^3$
Mt—Million ton
mbsf—Meters below seafloor
$\sigma_{fp}$—Fracture pressure gradient, kPa/m
v—Poisson's ratio; 0.25 is assumed for sandstone reservoir, 0.4 for shale
$\sigma_{ob}$—Overburden pressure gradient, kPa/m
$\sigma_p$—Pore pressure gradient, kPa/m
$\sigma_w$—Seawater pressure gradient, 10.52 kPa/m
$h_w$—Water depth, m
$\sigma_b$—Rock overburden, 24.88 kPa/m
$h_b$—Buried depth below the seafloor for the sandstone reservoirs, m
$V_g$—Gas molar volume, $m^3$/mole
$V_q$—Water molar volume, $m^3$/mole
$V_h$—Gas hydrate molar volume, $m^3$/mole A plurality of additional features and feature refinements are applicable to specific embodiments. These additional features and feature refinements may be used individually or in any combination. It is noted that each of the following features discussed may be, but are not necessary to be, used with any other feature or combination of features of any of the embodiments presented herein.

Unless otherwise defined, all technical and scientific terms used herein have the same meanings as are commonly understood by one of ordinary skill in the art to which this disclosure belongs. Although methods similar or equivalent to those described herein can be used in the practice or testing of the present disclosure, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present disclosure is not limited to what has been particularly shown and described hereinabove. Rather, the scope of the present disclosure is defined by the appended claims and includes both combinations and sub-combinations of the various features described hereinabove as well as variations and modifications thereof, which would occur to persons skilled in the art upon reading the foregoing description.

We claim:

1. A method for sequestering carbon dioxide, comprising:
    identifying an offshore aquifer, wherein a majority of the offshore aquifer is configured as a pressure management reservoir;
    forming the pressure management reservoir via a plurality of wellbores inside or around the perimeter of the offshore aquifer, the pressure management reservoir defined and bound by the plurality of wellbores;
    assigning at least one function to each of the plurality of wellbores, wherein the at least one function comprises carbon dioxide injection into the pressure management reservoir and water production from the pressure management reservoir;
    injecting, via at least one of the plurality of wellbores, carbon dioxide into the pressure management reservoir;
    producing, via at least one other of the plurality of wellbores, water from the offshore aquifer; and
    wherein the production of the water maintains the pressure management reservoir pressure below a reservoir fracture pressure and a hydrate formation pressure.

2. The method of claim 1, further comprising storing the carbon dioxide in the offshore aquifer as carbon dioxide hydrate.

3. The method of claim 1, further comprising storing from between 2% to 80% of a total pore volume of carbon dioxide within the pressure management reservoir.

4. The method of claim 1, further comprising storing from between 2% to 80% of a total pore volume of carbon dioxide within the pressure management reservoir.

5. The method of claim 1, further comprising storing a total quantity of carbon dioxide ranging from 1 million tons to 2600 million tons.

6. The method of claim 5, wherein the injecting of carbon dioxide is carried out during all of the separate, preselected timed phases.

7. The method of claim 1, wherein the injecting of the carbon dioxide and the producing of the water are carried out during separate, preselected timed phases.

8. The method of claim 1, wherein at least a portion of the offshore aquifer is contained within a hydrate stability zone.

9. The method of claim 8, wherein the entirety of the offshore aquifer is contained within the hydrate stability zone.

10. The method of claim 8, wherein the hydrate stability zone exists at a water depth greater than 630 meters.

11. A for sequestering carbon dioxide, comprising:
    an offshore aquifer configured as a pressure management reservoir;
    a plurality of wellbores positioned inside or along a perimeter of the offshore aquifer the pressure management reservoir defined and bound by the plurality of wellbores;
    the carbon dioxide configured to be injected into the pressure management reservoir via at least one of the plurality of wellbores;

and water configured to be produced from at least one of the plurality of wellbores drilled into the offshore aquifer;

wherein production of the water from the offshore aquifer maintains the pressure management reservoir pressure below a pressure management reservoir fracture pressure and a hydrate formation pressure.

12. The system of claim 11, wherein the carbon dioxide is stored in the offshore aquifer as carbon dioxide hydrate.

13. The system of claim 12, wherein the injection of the carbon dioxide and the production of the water are carried out during separate, preselected timed phases.

14. The system of claim 12, wherein carbon dioxide is injected during all of the separate, preselected timed phases.

15. The system of claim 11, wherein a total pore volume of carbon dioxide ranges from 2% to 80% within the pressure management reservoir.

16. The system of claim 11, wherein a total stored quantity of carbon dioxide ranges from 1 million tons to 2600 million tons.

17. The system of claim 11, wherein at least a portion of the offshore aquifer is contained within a hydrate stability zone.

18. The method system of claim 17, wherein the entirety of the offshore aquifer is contained within the hydrate stability zone, or straddling the hydrate stability zone.

19. The system of claim 17, wherein the hydrate stability zone exists at a water depth greater than 630 meters.

20. The system of claim 17, wherein the hydrate stability zone exists at a water depth greater than 200 meters.

* * * * *